(12) United States Patent
Xiong et al.

(10) Patent No.: US 11,171,744 B2
(45) Date of Patent: Nov. 9, 2021

(54) UPLINK NON-ORTHOGONAL MULTIPLE ACCESS TRANSMISSION SCHEME

(71) Applicant: Apple Inc., Cupertino, CA (US)

(72) Inventors: Gang Xiong, Portland, OR (US);
Yongjun Kwak, Portland, OR (US);
Sergey Sosnin, Zavolzhie NIZ (RU);
Hwan-Joon Kwon, Portland, OR (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/264,243

(22) Filed: Jan. 31, 2019

(65) Prior Publication Data

US 2019/0173616 A1    Jun. 6, 2019

Related U.S. Application Data

(60) Provisional application No. 62/627,077, filed on Feb. 6, 2018.

(51) Int. Cl.
| | |
|---|---|
| *H04L 1/00* | (2006.01) |
| *H04L 5/00* | (2006.01) |
| *H04L 27/26* | (2006.01) |
| *H04W 72/04* | (2009.01) |
| *H04L 25/03* | (2006.01) |
| *H04J 13/00* | (2011.01) |

(52) U.S. Cl.
CPC ........ *H04L 1/0071* (2013.01); *H04J 13/0003* (2013.01); *H04L 1/0041* (2013.01); *H04L 5/0021* (2013.01); *H04L 5/0048* (2013.01); *H04L 25/03866* (2013.01); *H04L 27/2628* (2013.01); *H04L 27/2636* (2013.01); *H04W 72/0466* (2013.01)

(58) Field of Classification Search
None
See application file for complete search history.

(56) References Cited

U.S. PATENT DOCUMENTS

| | | | |
|---|---|---|---|
| 2016/0112221 A1* | 4/2016 | Zhang | H04W 76/14 370/328 |
| 2018/0367358 A1* | 12/2018 | Baligh | H04L 5/0057 |

(Continued)

OTHER PUBLICATIONS

Qian et al., "Low complexity detection algorithm for low PAPR interleaving based NoMA schemes," Samsung Research Institute China—Beijing (SRC-B), Sep. 24-27, 2017 IEEE, 2017 IEEE 86th Vehicular Technology Conference (VTC-Fall), Toronto, ON, 7 pages.

(Continued)

*Primary Examiner* — Rebecca E Song
(74) *Attorney, Agent, or Firm* — Sterne, Kessler, Goldstein & Fox P.L.L.C.

(57) ABSTRACT

Embodiments of the present disclosure describe methods, apparatuses, storage media, and systems for uplink non-orthogonal multiple access transmission schemes employed by transmit circuitry. A transmitter circuitry in a User Equipment (UE) may include an encoder circuitry to generate an encoded sequence, a first scrambling circuitry to perform first-part scrambling on the encoded sequence to generate a first scrambled sequence, and a second scrambling circuitry to perform second-part scrambling on a spread modulated symbols to generate a second scrambled sequence. Other embodiments may be described and claimed.

20 Claims, 11 Drawing Sheets

(56) References Cited

U.S. PATENT DOCUMENTS

2019/0007092 A1* 1/2019 Bayesteh .................. H04L 1/00
2019/0200378 A1* 6/2019 Ko ...................... H04W 72/042
2019/0281534 A1* 9/2019 Yu ........................ H04B 7/0617
2020/0187159 A1* 6/2020 Ko ........................ H04L 5/0051

OTHER PUBLICATIONS

3GPP, "Technical Specification Group Radio Access Network; NR; Physical channels and modulation (Release 15)," 3GPP TS 38.211 V15.0.0 (Dec. 2017), 5G, 73 pages.

* cited by examiner

UPLINK NON-ORTHOGONAL MULTIPLE ACCESS TRANSMISSION SCHEME

CROSS REFERENCE TO RELATED APPLICATION

The present application claims priority to U.S. Provisional Patent Application No. 62/627,077 filed Feb. 6, 2018, and entitled "Novel Uplink (UL) Non-Orthogonal Multiple Access Transmission Scheme for Peak to Average Power Ratio (PAPR) Reduction." The entire disclosure of which is hereby incorporated by reference in its entirety

FIELD

Embodiments of the present invention relate generally to the technical field of wireless communications.

BACKGROUND

Mobile communication has evolved significantly from early voice systems to highly sophisticated integrated communication platforms. The next generation wireless communication system, 5G, or New Radio (NR), will provide access to information and sharing of data by various users and applications. NR is expected to be a unified network/system that targets to meet vastly different and sometimes conflicting performance dimensions and services. Such diverse multi-dimensional requirements are driven by different services and applications. In general, NR will evolve based on $3^{rd}$ Generation Partnership Project (3GPP) Long Term Evolution (LTE)-Advanced with additional potential new Radio Access Technologies (RATs) to provide better, simple and seamless wireless connectivity. NR will enable everything connected by wireless and deliver fast, rich contents and services.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
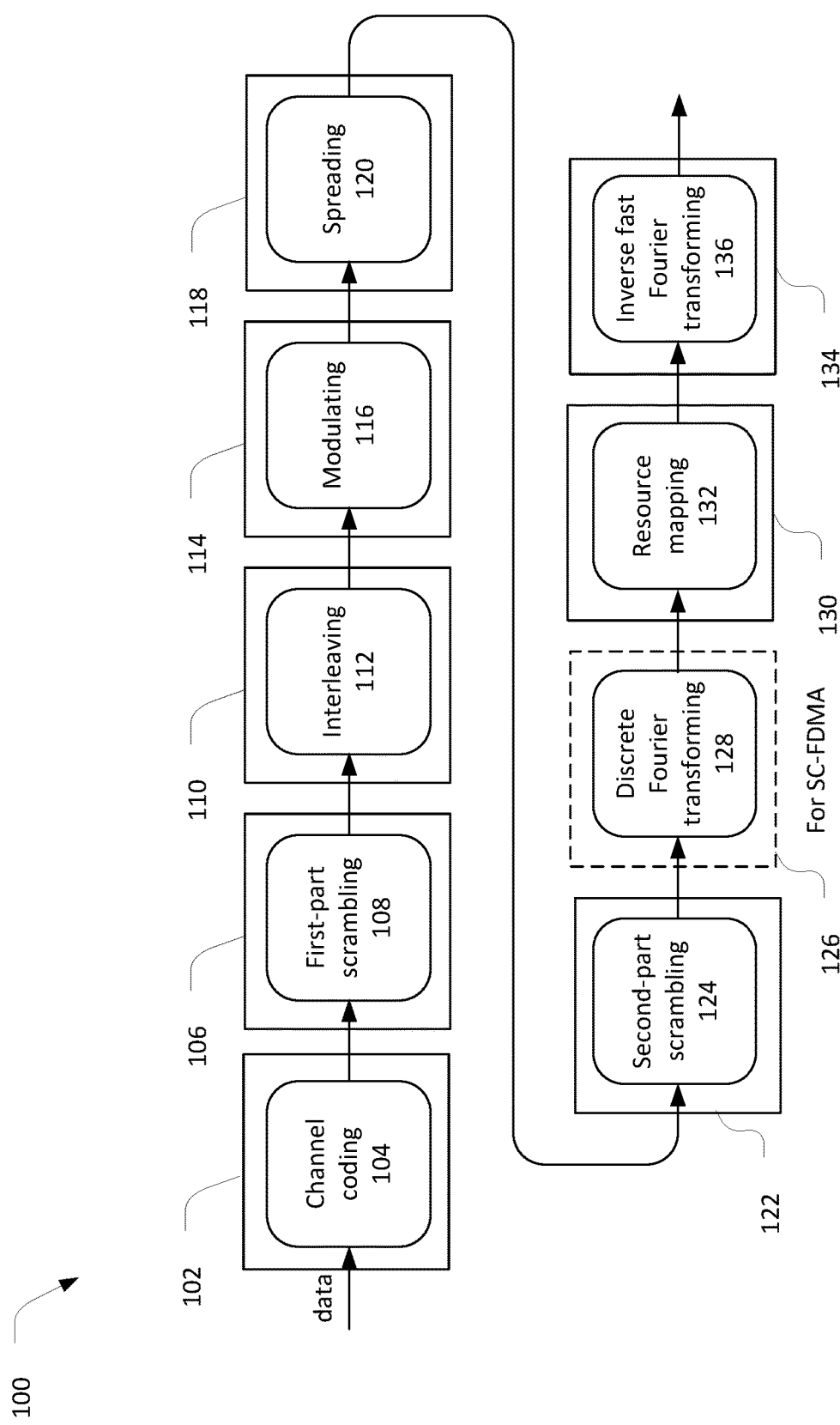
FIG. 1 illustrates transmit circuitry to employ a UL NOMA transmission scheme in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

Grant-free uplink (UL) or configured grant UL transmissions based on non-orthogonal multiple access (NOMA) is one of the NR study items in 3GPP. UL NOMA may target various use cases including massive connectivity for machine type communication (MTC), support of low overhead UL transmission schemes towards minimizing device power consumption for transmission of small data packets, low latency application such as ultra-reliable and low latency communication (URLLC).

A UL NOMA transmission scheme may employ a number of uplink processing operations. A channel coding may use a repetition or other low-coding-rate forward error correction (FEC) encoding scheme. After scrambling and interleaving, incoming symbols from a quadrature amplitude modulation (QAM) modulator are spread using one of multiple orthogonal codes. Further, the spread symbols are added to each other before resource (for example, subcarrier) mapping and an inverse fast Fourier transform (IFFT) operation is performed to provide an Orthogonal Frequency-Division Multiplexing (OFDM)-based waveform. In the case of single carrier-frequency division multiple access (SC-FDMA) based waveform, additional discrete Fourier transform (DFT)-spreading block is inserted prior to subcarrier mapping.

For a sequence-spreading-based NOMA scheme, either time or frequency domain spreading can be applied on modulated symbols. Sequence-spreading-based NOMA scheme may include per-resource element (RE)-based time and frequency domain spreading. For example, a length-4 spreading sequence may be assumed. In particular, a spreading sequence is used to spread the modulated symbols in an increasing order of subcarrier and symbol, respectively. Time and frequency domain spreading can be further applied for different physical resource blocks (PRBs) and subframes or slots, respectively.

In case of frequency domain spreading for UL NOMA transmission, due to the use of a same spreading sequence for modulated symbols, a peak-to-average power ratio (PAPR) and cubic metric (CM) can be increased significantly for both OFDM and SC-FDMA waveform. Simulation results for PAPR for UL NOMA scheme with and without spreading, assuming that a length-4 Hadamard sequence is applied for spreading, show that for both OFDM and SC-FDMA waveforms, PAPR is increased substantially when same spreading sequence is applied on the modulated symbols.

For massive MTC application in NR, this PAPR increase is not desirable especially considering the coverage enhancement, for example, with 164 dB maximum coupling loss (MCL) as one of the objectives for massive MTC. Hence, certain transmission schemes may need to be defined to reduce PAPR, minimize power amplifier (PA) back-off and thereby improve the coverage.

Embodiments herein may disclose UL NOMA transmission schemes that may reduce PAPR. This may, in turn, facilitate communications in various NR applications such as, but not limited to, massive connectivity for MTC, support of low overhead UL transmission schemes towards minimizing device power consumption for transmission of small data packets, and low latency application such as URLLC.

FIG. 1 illustrates transmit circuitry 100 to employ a UL NOMA transmission scheme that includes a two-part scrambling operation in accordance with some embodiments. The transmit circuitry 100 may include various circuit components of a user equipment to perform described uplink processing operations. For example, an encoder 102 may perform channel coding 104, a scrambler 106 may perform first-step scrambling 108, and interleaver 110 may perform interleaving 112, a modulator 114 may perform modulating 116, a spreader 118 may perform spreading 120, a scrambler 122 may perform second-step scrambling 124, a transformer 126 may perform discreet Fourier transforming 128, a mapper 130 may perform resource mapping 132, and a transformer 134 may perform inverse fast Fourier transforming 136.

Incoming data may be received by the encoder 102 for the channel coding 104. The channel coding 104 may encode the data to generate an encoded sequence according to any one of a number of channel codes. For example, channel coding 104 may make use of one or more of convolutional coding, tail biting convolutional coding, parallel concatenated convolutional coding (PCCC), which may be referred to as turbo encoding, low density parity check (LDPC) coding, block coding, and polar coding. Typically, though not exclusively, the uplink shared channel (UL-SCH), which may be carried by the PUSCH, may use LDPC coding.

After the channel coding 104, the data, represented as an encoded sequence, may be provided to a scrambler 106 for first-part scrambling 108. First-part scrambling 108 can be used for interference randomization and may generate a scrambling sequence in a manner to similar to PUSCH scrambling sequence generation. The encoded sequence may be scrambled based on the generated scrambling sequence.

The first-part scrambling 108, the scrambling sequence can be initialized as $$C_{init}=n_{RNTI} \cdot 2^{15}+n_{ID}$$

where $n_{RNTI}$ is a radio network temporary identifier (RNTI), for example, a cell-RNTI (C-RNTI), for grant-based uplink transmission; $n_{ID}$ is configured by higher layers via radio resource control (RRC) signaling and if not configured, $n_{ID}=n_{ID}^{cell}$, where $n_{ID}^{cell}$ is a physical cell identifier.

For autonomous UL NOMA transmission, where C-RNTI is not available at user equipment (UE) side, for example, in case of the UE being in an RRC IDLE state or RRC INACTIVE, the scrambling sequence may be initialized as $$C_{init}=n_{DMRS} \cdot 2^{15}+n_{ID}^{cell},$$

where $n_{DMRS}$ can be a demodulation reference signal (DM-RS) sequence index or DM-RS antenna port (AP) index associated with UL NOMA data transmission. Alternatively, it can be a preamble index for a physical random access channel (PRACH) transmission associated with UL NOMA data transmission. This may apply for the two-part random access (RACH) procedure where a PRACH preamble is transmitted together with UL data in the first part of two-part RACH procedure.

After the first-part scrambling 108, the data, represented as a scrambled sequence, may be provided to the interleaver 110 for interleaving 112 to provide an interleaved sequence. The interleaving may be bit-level interleaving based on, for example, interleave-division multiple access (IDMA) or interleave-grid multiple access (IGMA).

After the interleaving 112, the data, represented as the interleaved sequence, may be provide to the modulator 114 for modulating 116. The modulator 114 may be a QAM modulator that is to generate modulated symbols. In other embodiments, other modulators/modulation schemes may be employed.

After modulating 116, the data, represented as modulated symbols, may be provided to the spreader 118 for spreading 120. Spreading 120 may spread the modulated symbols to provide a spread modulated symbols.

After spreading 120, the data, represented as spread modulate symbols, may be provided to the scrambler 122 for second-part scrambling 124. The scrambler 122 that performs the second-part scrambling 124 may be the same as or different from the scrambler 106 that performs the first-part scrambling 108. The second-part scrambling 124 may reduce PAPR or increase capacity in case when a number of spreading codes is limited.

The second-part scrambling 124 may generate and use a pseudo noise (PN) modulated sequence to scramble the spread modulated symbols. The modulating for the PN modulated sequence may be based on a quadrature phase shift keying (QPSK) modulation. However, in other embodiments, other modulating schemes may be used.

The PN sequence used for the second-part scrambling 124 can be initialized based on one or more of the following parameters: UE ID (for example, C-RNTI), DM-RS AP index, physical cell ID, virtual cell ID, resource ID (for example, in case when multiple resources are configured for UL NOMA transmission), symbol index, slot index, or frame index.

In one example, the PN sequence can be initialized as $$C_{init}=n_{ID}.$$

In case when $n_{ID}=n_{ID}^{cell}$, the same scrambling sequence used in the first-part scrambling 108 may be generated/used in the second-part scrambling. In this situation, the second-part scrambling 124 may be primarily used for PAPR reduction.

In another example, the PN sequence can be initialized as $$C_{init}=n_{RNTI} \cdot 2^{15}+n_{ID}+\Delta,$$

where $\Delta$ can be a constant, which can be predefined in the specification or configured by higher layers via NR minimum system information (MSI), NR remaining minimum system information (RMSI), NR other system information (OSI) or radio resource control (RRC) signaling.

In another example, the PN sequence can be initialized as $$C_{init} = n_{DMRS} \cdot 2^{15} + n_{ID} + \Delta,$$

In another example, the scrambling sequence generated/used for the second-part scrambling 124 can be generated on a per-symbol basis. In other words, the scrambling sequence may be initialized as a function of at least symbol index within a slot for UL NOMA transmission.

If SC-FDMA is used, the scrambled sequence produced from the second-part scrambling 124 may be provided to a transformer for discrete Fourier transforming 128 that is to generate a transformed sequence. The transformed sequence may be the same length as the input scrambled sequence and may include complex-valued symbols that represent samples of a discrete-time Fourier transform (DTFT).

The scrambled or transformed sequence may be provided to the mapper 130 for resource mapping 132. The resource mapping 132 may map the sequences onto resource elements to provide a mapped sequence.

The mapped sequence may be provided to the transformer 134 for Inverse fast Fourier transforming 136. The inverse fast Fourier transforming 136 may convert the mapped sequence from a frequency domain to a time domain for transmission.

Figure 2:
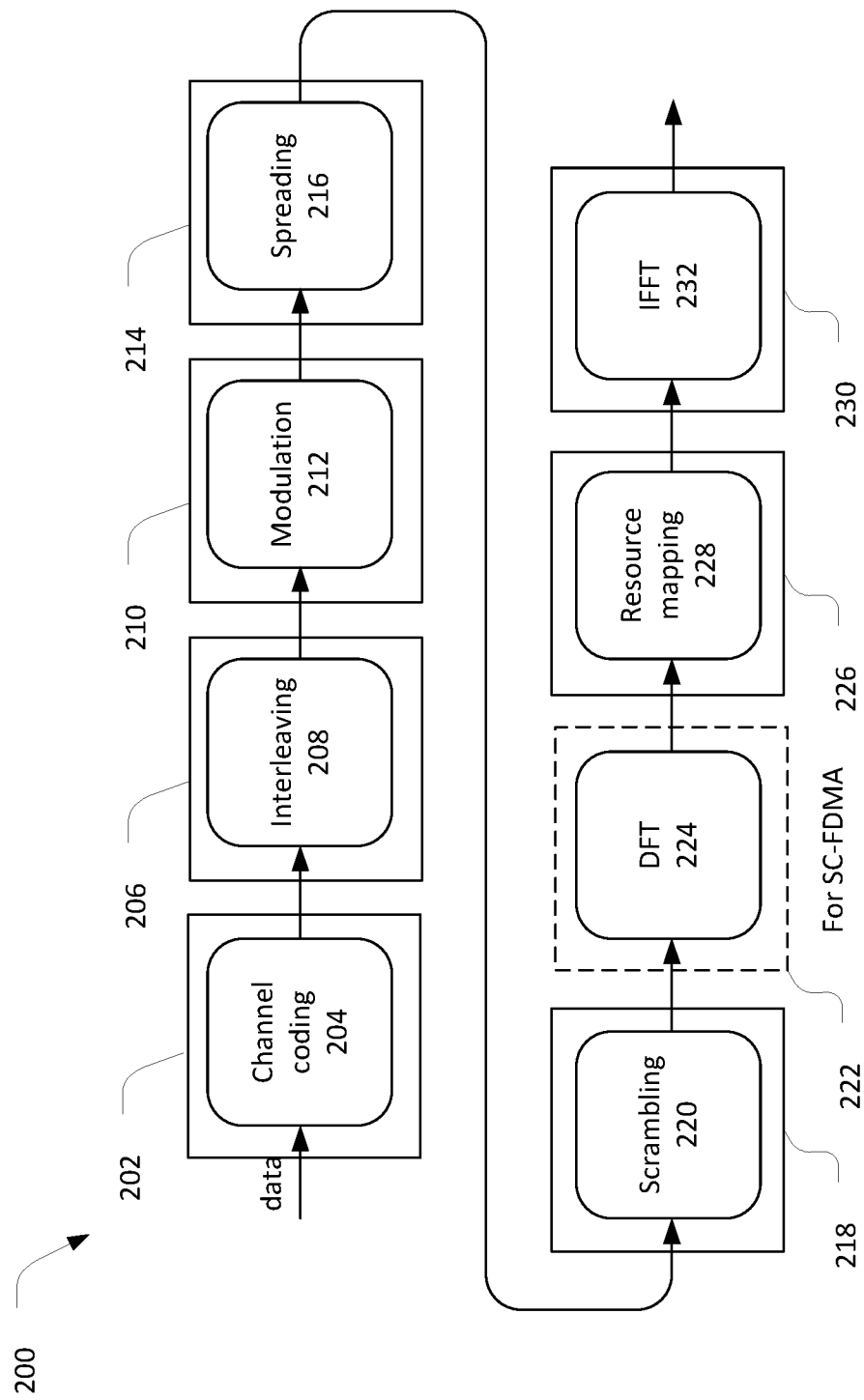
FIG. 2 illustrates transmit circuitry to employ a UL NOMA transmission scheme in accordance with some embodiments.

FIG. 2 illustrates transmit circuitry 200 to employ a UL NOMA transmission scheme that includes one scrambling operation in accordance with some embodiments. The transmit circuitry 200 may include transmit circuitry to perform various uplink processing operations similar to like-named circuit components/operations described above with respect to FIG. 1. For example, the transmit circuitry 200 may include an encoder 202, an interleaver 206, a modulator 210, a spreader 214, a scrambler 218, a transformer 222, a mapper 226, and a transformer 230.

Instead of including a two-part scrambling operation like scheme employed by transmit circuitry 100, the transmit circuitry 200 may employ a scheme that includes one scrambling operation 220 that is to occur after spreading 216. The scrambling operation 220 may include a scrambling sequence initialization as mentioned above for first-part scrambling 108 or second-part scrambling 124 and can be applied on one step.

Figure 3:
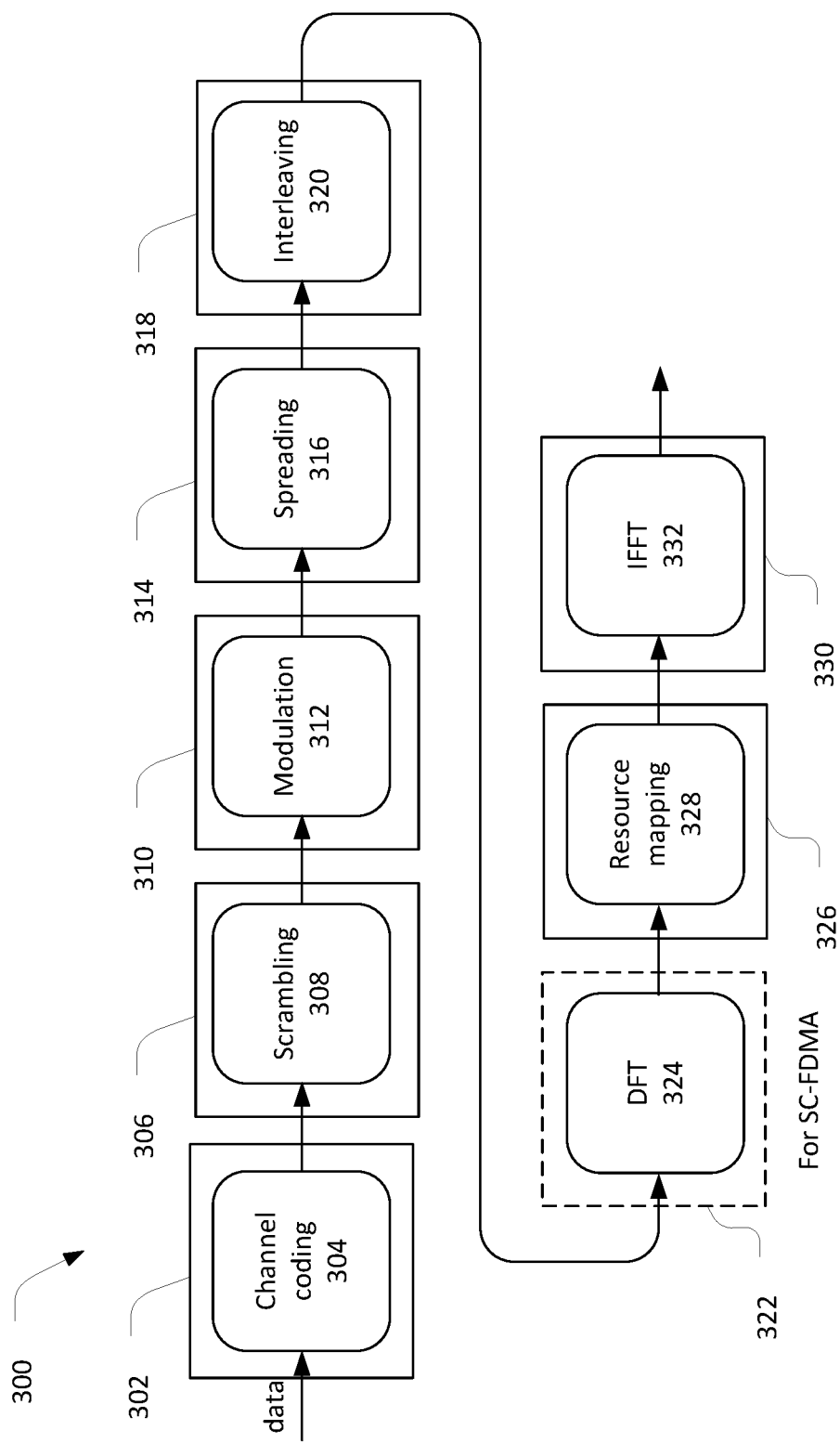
FIG. 3 illustrates transmit circuitry to employ a UL NOMA transmission scheme in accordance with some embodiments.

FIG. 3 illustrates transmit circuitry 300 to employ a UL NOMA transmission scheme in accordance with some embodiments. The transmit circuitry 300 may include transmit circuitry to perform various uplink processing operations similar to like-named circuit components/operations described above with respect to FIG. 1 or 2. For example, the transmit circuitry 300 may include an encoder 302, a scrambler 306, a modulator 310, a spreader 314, an interleaver 318, a transformer 322, a mapper 326, and a transformer 330.

Like the scheme employed by transmit circuitry 200, the scheme employed by transmit circuitry 300 may include one-step scrambling, at scrambling 308. The scheme employed by transmit circuitry 300 may further include interleaving 320 that is to be performed after spreading 316. Thus, an interleaver can perform interleaving 320 over modulated symbols after spreading 316. This may reduce PAPR in some instances.

In various embodiments, a fixed or UE-specific interleaver may be employed for the interleaving 320. If a UE-specific interleaver is used, the interleaving 320 may generate an interleaved sequence as a function of one or more parameters: UE ID (e.g., C-RNTI), DM-RS AP index, physical cell ID, virtual cell ID, or resource ID (in case when multiple resources are configured for UL NOMA transmission). This can also apply for the use of random (or pseudo random) interleaver.

Figure 4:
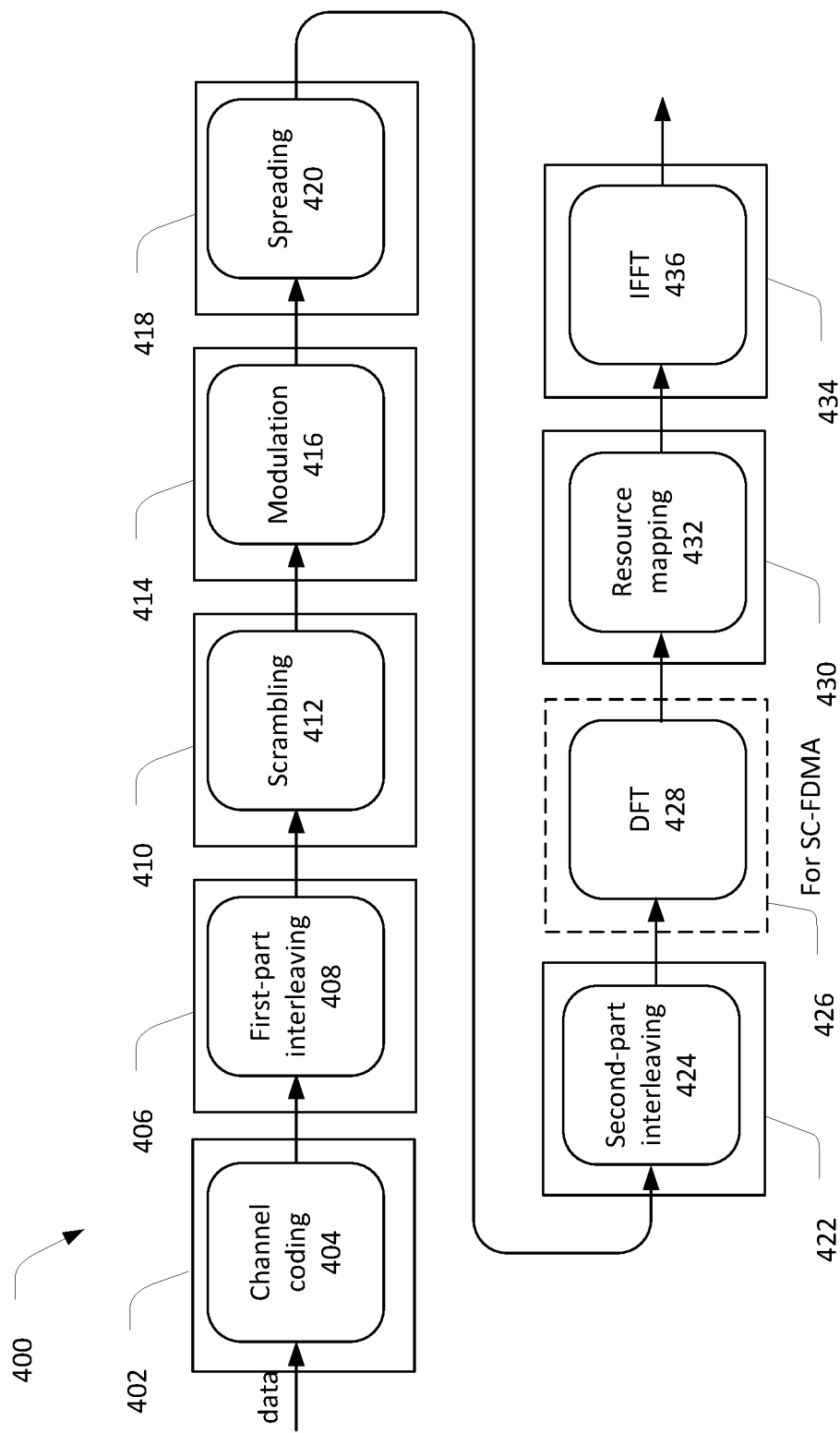
FIG. 4 illustrates transmit circuitry to employ a UL NOMA transmission scheme in accordance with some embodiments.

FIG. 4 illustrates transmit circuitry 400 to employ a UL NOMA transmission scheme in accordance with some embodiments. The transmit circuitry 400 may include circuitry to perform various uplink processing operations similar to like-named circuit components/operations described above with respect to FIG. 1, 2, or 3. For example, the transmit circuitry 400 may include an encoder 402, and interleaver 406, a scrambler 410, a modulator 414, a spreader 418, and interleaver 422, a transformer 426, a mapper 430, and a transformer 436.

Like the scheme employed by transmit circuitry 200, the scheme employed by transmit circuitry 300 may include one-step scrambling, at scrambling 412. The scheme employed by transmit circuitry 400 may further include a two-part interleaving operation. In particular, a first-part interleaving 408 can be performed right after channel coding 404 on the encoded sequence. Second-part interleaving 424 can be performed after spreading 420 on the spread modulated symbols. The first-part interleaving 408 may be the same as or different from the second-part interleaving 424.

Figure 5:
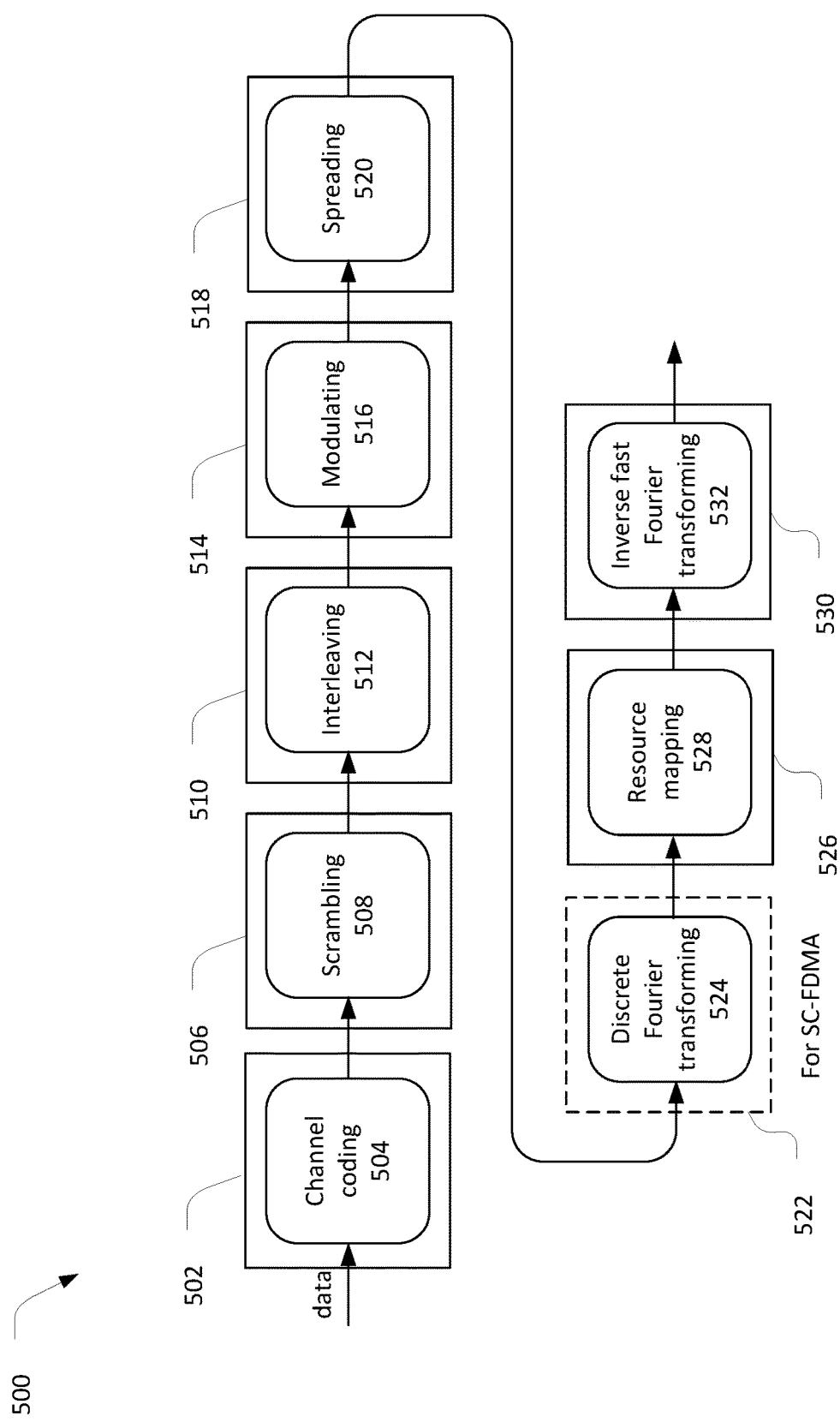
FIG. 5 illustrates transmit circuitry to employ a UL NOMA transmission scheme in accordance with some embodiments.

FIG. 5 illustrates transmit circuitry 500 to employ a UL NOMA transmission scheme in accordance with some embodiments. The transmit circuitry 500 may include circuitry to perform various uplink processing operations similar to like-named circuit components/operations described above with respect to FIG. 1, 2, 3, or 4. For example, the transmit circuitry 500 may include an encoder 502, a scrambler 506, an interleaver 510, a modulator 514, a spreader 518, a transformer 522, a mapper 526, and a transformer 530.

The scheme employed by transmit circuitry 500 may include spreading operation 520 performed just prior to the DFT operation. This spreading operation 520 may be performed by applying a block-wise orthogonal cover code as follows.

Assuming data symbols (from modulating 516 and) before spreading as d(0), . . . , d($M_{sym}$−1), where $M_{sym}$ is the number of data symbols, the output after block-wised spreading operation of spreading 520 can be given as $$y(l \cdot M_{sc} + k) = w_n(k) \cdot d\left(\frac{lM_{sc}}{N_{SF}} + k \bmod \frac{M_{sc}}{N_{SF}}\right),$$

where k is a subcarrier index, l is a symbol index, $M_{sc}$ is a number of subcarriers for data transmission, $N_{SF}$ is a spreading factor, for example, $N_{SF}$=2, 4, 8, etc., and $w_n(k)$ is a block-wised spreading sequence.

When $N_{SF}$=2, the spreading sequence can be given as $$w = \begin{bmatrix} 1 & 1 \\ 1 & -1 \end{bmatrix} \otimes w_0.$$

When $N_{SF}$=4, the spreading sequence can be given as $$w = \begin{bmatrix} 1 & 1 & 1 & 1 \\ 1 & -j & -1 & j \\ 1 & -1 & 1 & -1 \\ 1 & j & -1 & -j \end{bmatrix} \otimes w_0.$$

When $N_{SF}=8$, the spreading sequence can be given as $$w = \begin{bmatrix} 1 & 1 & 1 & 1 & 1 & 1 & 1 & 1 \\ 1 & \exp\left(\frac{j\pi}{4}\right) & j & \exp\left(\frac{j3\pi}{4}\right) & -1 & \exp\left(\frac{j5\pi}{4}\right) & -j & \exp\left(\frac{j7\pi}{4}\right) \\ 1 & j & -1 & -j & 1 & j & -1 & -j \\ 1 & \exp\left(\frac{j3\pi}{4}\right) & -j & \exp\left(\frac{j\pi}{4}\right) & -1 & \exp\left(\frac{j7\pi}{4}\right) & j & \exp\left(\frac{j5\pi}{4}\right) \\ 1 & -1 & 1 & -1 & 1 & -1 & 1 & -1 \\ 1 & \exp\left(\frac{j5\pi}{4}\right) & j & \exp\left(\frac{j7\pi}{4}\right) & -1 & \exp\left(\frac{j\pi}{4}\right) & -j & \exp\left(\frac{j3\pi}{4}\right) \\ 1 & -j & -1 & j & 1 & -j & -1 & j \\ 1 & \exp\left(\frac{j7\pi}{4}\right) & -j & \exp\left(\frac{j5\pi}{4}\right) & -1 & -\exp\left(\frac{j\pi}{4}\right) & j & \exp\left(\frac{j\pi}{4}\right) \end{bmatrix} \otimes w_0.$$

Generally for $N_{SF}$, the spreading sequence can be given as $$w = \begin{bmatrix} \exp\left(\frac{0\cdot 0\cdot j2\pi}{N_{SF}}\right) & \exp\left(\frac{1\cdot 0\cdot j2\pi}{N_{SF}}\right) & \cdots & \exp\left(\frac{(N_{SF}-1)\cdot 0\cdot j2\pi}{N_{SF}}\right) \\ \exp\left(\frac{0\cdot 1\cdot j2\pi}{N_{SF}}\right) & \exp\left(\frac{1\cdot 1\cdot j2\pi}{N_{SF}}\right) & \cdots & \exp\left(\frac{(N_{SF}-1)\cdot 1\cdot j2\pi}{N_{SF}}\right) \\ \vdots & \vdots & \ddots & \vdots \\ \exp\left(\frac{0\cdot (N_{SF}-1)\cdot j2\pi}{N_{SF}}\right) & \exp\left(\frac{1\cdot (N_{SF}-1)\cdot j2\pi}{N_{SF}}\right) & \cdots & \exp\left(\frac{(N_{SF}-1)\cdot (N_{SF}-1)\cdot j2\pi}{N_{SF}}\right) \end{bmatrix} \otimes w_0,$$

where $w_0$ is a vector with length $M_{sc}/N_{SF}$.

In one example, $w_0(m)=1$, where $$m = 0, 1, \ldots \frac{M_{sc}}{N_{SF}} - 1.$$

In another example, $w_0(m)=\exp(-j\cdot\Delta\phi\cdot m)$, where $$m = 0, 1, \ldots \frac{M_{sc}}{N_{SF}} - 1,$$

and $\Delta\phi$ is a phase shift, which can be predefined in the specification. For instance, $$\Delta\phi = \frac{2\pi}{M_{sc}/N_{SF}}.$$

In various embodiments, the same design principle can be straightforwardly extended to other spreading factors.

Figure 6:
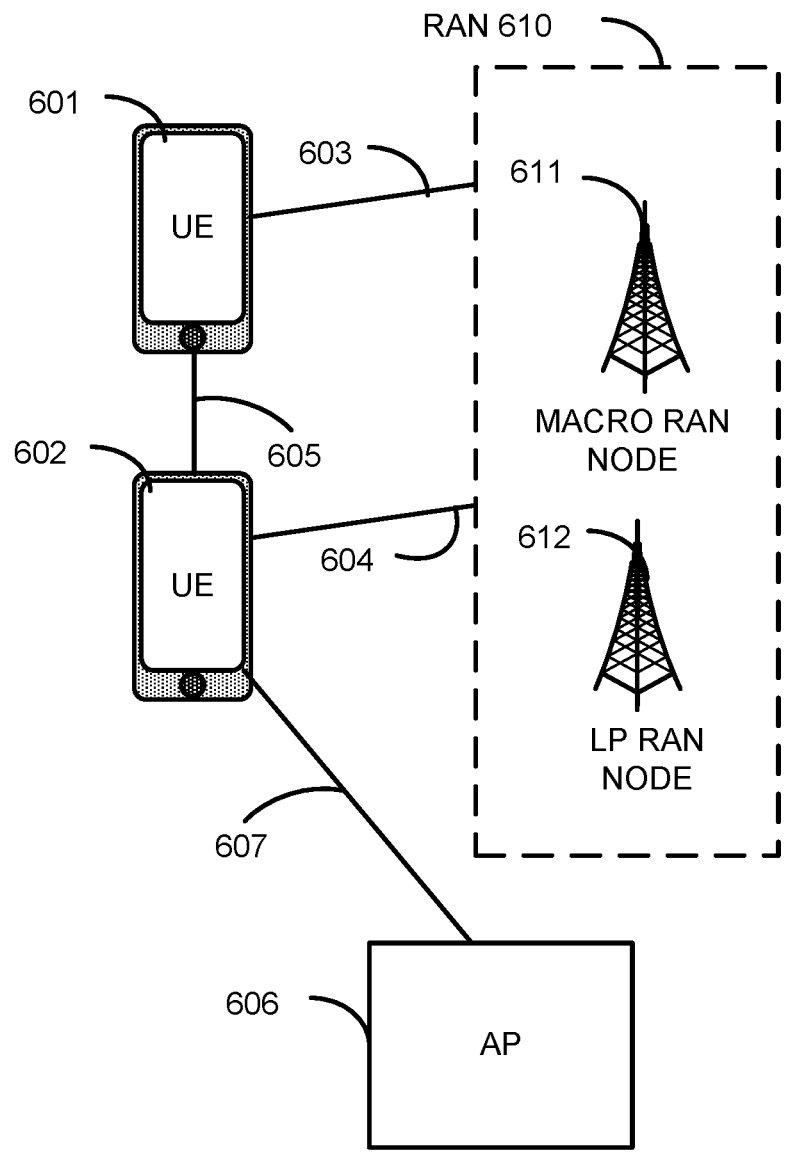
FIG. 6 illustrates an architecture of a system of a network in accordance with some embodiments.

FIG. 6 illustrates an architecture of a system 600 of a network in accordance with some embodiments. The system 600 is shown to include a user equipment (UE) 601 and a UE 602. As used herein, the term "user equipment" or "UE" may refer to a device with radio communication capabilities and may describe a remote user of network resources in a communications network. The term "user equipment" or "UE" may be considered synonymous to, and may be referred to as client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. In this example, UEs 601 and 602 are illustrated as smartphones (e.g., handheld touch-screen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine-type communications (MTC) devices, machine-to-machine (M2M), Internet of Things (IoT) devices, and/or the like.

Either or both of the UEs 601 and 602 may be configured with transmit circuitry having circuit components to employ any one of the UL NOMA transmission schemes shown and described above with respect to FIGS. 1-5.

In some embodiments, any of the UEs 601 and 602 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 601 and 602 may be configured to connect, e.g., communicatively couple, with a radio access network (RAN) 610—the RAN 610 may be, for example, an Evolved Universal Mobile Telecommunications System (UMTS) Terrestrial Radio Access Network (E-UTRAN), a NextGen RAN (NG RAN), or some other type of RAN. The UEs 601 and 602 utilize connections (or channels) 603 and 604, respectively, each of which comprises a physical communications interface or layer (discussed in further detail infra). As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices through a Radio Access Technology (RAT) for the purpose of transmitting and receiving information. In this example, the connections 603 and 604 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 601 and 602 may further directly exchange communication data via a ProSe interface 605. The ProSe interface 605 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH). In various implementations, the SL interface 605 may be used in vehicular applications and communications technologies, which are often referred to as V2X systems. V2X is a mode of communication where UEs (for example, UEs 601, 602) communicate with each other directly over the PC5/SL interface 105 and can take place when the UEs 601, 602 are served by RAN nodes 611, 612 or when one or more UEs are outside a coverage area of the RAN 610. V2X may be classified into four different types: vehicle-to-vehicle (V2V), vehicle-to-infrastructure (V2I), vehicle-to-network (V2N), and vehicle-to-pedestrian (V2P). These V2X applications can use "co-operative awareness" to provide more intelligent services for end-users. For example, vUEs 601, 602, RAN nodes 611, 612, application servers 630, and pedestrian UEs 601, 602 may collect knowledge of their local environment (for example, information received from other vehicles or sensor equipment in proximity) to process and share that knowledge in order to provide more intelligent services, such as cooperative collision warning, autonomous driving, and the like. In these implementations, the UEs 601, 602 may be implemented/employed as Vehicle Embedded Communications Systems (VECS) or vUEs.

The UE 602 is shown to be configured to access an access point (AP) 606 (also referred to as also referred to as "WLAN node 606", "WLAN 606", "WLAN Termination 606" or "WT 606" or the like) via connection 607. The connection 607 can comprise a local wireless connection, such as a connection consistent with any IEEE 802.11 protocol, wherein the AP 606 would comprise a wireless fidelity (WiFi®) router. In this example, the AP 606 is shown to be connected to the Internet without connecting to the core network of the wireless system (described in further detail below). In various embodiments, the UE 602, RAN 610, and AP 606 may be configured to utilize LTE-WLAN aggregation (LWA) operation and/or WLAN LTE/WLAN Radio Level Integration with IPsec Tunnel (LWIP) operation. The LWA operation may involve the UE 602 in RRC CONNECTED being configured by a RAN node 611, 612 to utilize radio resources of LTE and WLAN. LWIP operation may involve the UE 602 using WLAN radio resources (e.g., connection 607) via Internet Protocol Security (IPsec) protocol tunneling to authenticate and encrypt packets (e.g., internet protocol (IP) packets) sent over the connection 607. IPsec tunneling may include encapsulating entirety of original IP packets and adding a new packet header thereby protecting the original header of the IP packets.

The RAN 610 can include one or more access nodes that enable the connections 603 and 604. As used herein, the terms "access node," "access point," or the like may describe equipment that provides the radio baseband functions for data and/or voice connectivity between a network and one or more users. These access nodes can be referred to as base stations (BS), NodeBs, evolved NodeBs (eNBs), next Generation NodeBs (gNB), RAN nodes, Road Side Units (RSUs), and so forth, and can comprise ground stations (e.g., terrestrial access points) or satellite stations providing coverage within a geographic area (e.g., a cell). The term "Road Side Unit" or "RSU" may refer to any transportation infrastructure entity implemented in or by an gNB/eNB/RAN node or a stationary (or relatively stationary) UE, where an RSU implemented in or by a UE may be referred to as a "UE-type RSU", an RSU implemented in or by an eNB may be referred to as an "eNB-type RSU." The RAN 610 may include one or more RAN nodes for providing macrocells, e.g., macro RAN node 611, and one or more RAN nodes for providing femtocells or picocells (e.g., cells having smaller coverage areas, smaller user capacity, or higher bandwidth compared to macrocells), e.g., low power (LP) RAN node 612.

In some embodiments, either or both of the RAN nodes 611 and 612 may be configured with receive circuitry having circuit components that complement the circuit components of the transmit circuitry described above with respect to FIGS. 1-5.

Any of the RAN nodes 611 and 612 can terminate the air interface protocol and can be the first point of contact for the UEs 601 and 602. In some embodiments, any of the RAN nodes 611 and 612 can fulfill various logical functions for the RAN 610 including, but not limited to, radio network controller (RNC) functions such as radio bearer management, uplink and downlink dynamic radio resource management and data packet scheduling, and mobility management.

In accordance with some embodiments, the UEs 601 and 602 can be configured to communicate using Orthogonal Frequency-Division Multiplexing (OFDM) communication signals with each other or with any of the RAN nodes 611 and 612 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 611 and 612 to the UEs 601 and 602, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

Figure 7:
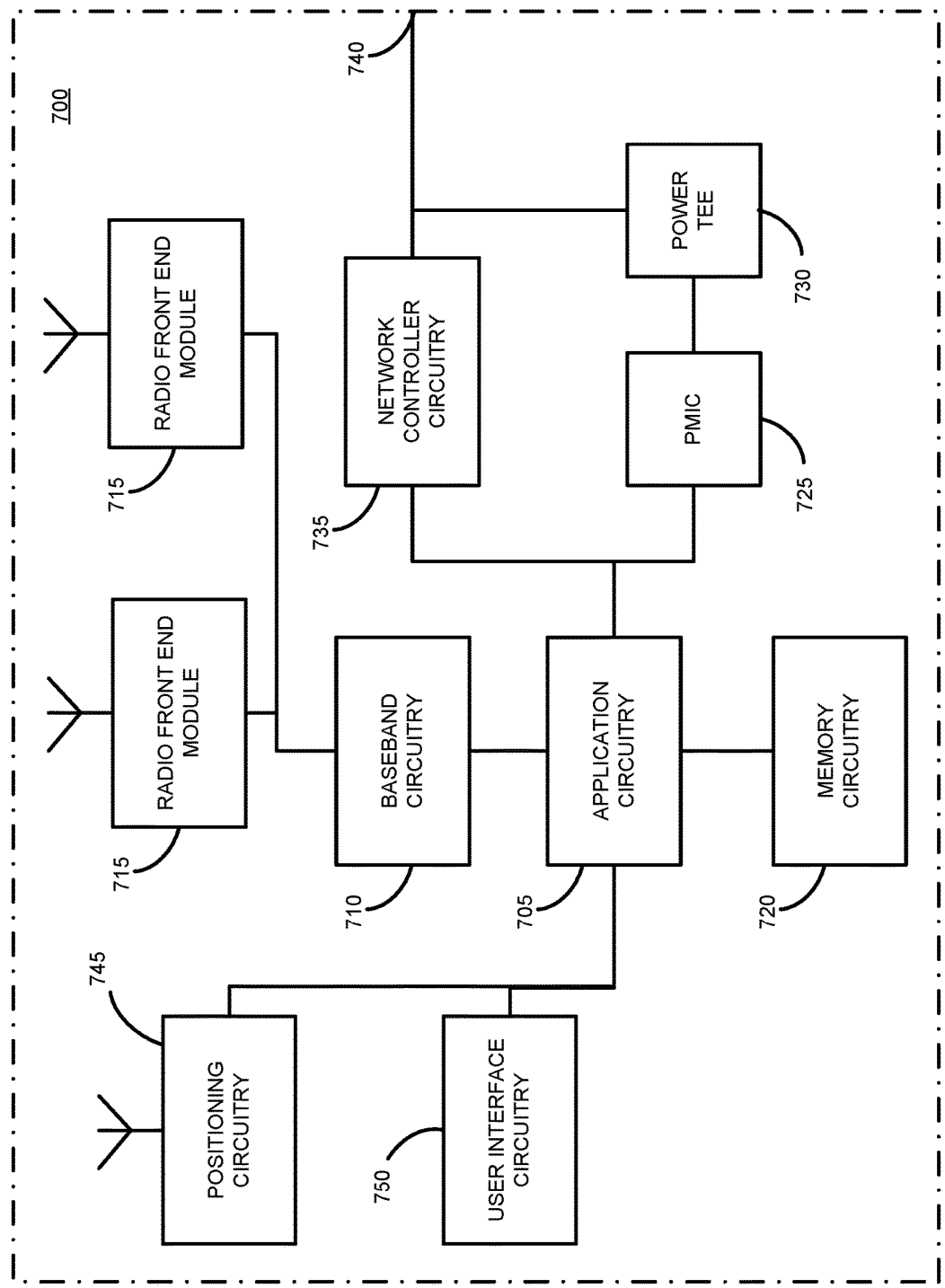
FIG. 7 illustrates an example of infrastructure equipment in accordance with various embodiments.

FIG. 7 illustrates an example of infrastructure equipment 700 in accordance with various embodiments. The infrastructure equipment 700 (or "system 700") may be implemented as a base station, radio head, RAN node, etc., such as the RAN nodes XQ11 and XQ12, and/or AP XQ06 shown and described previously. In other examples, the system 700 could be implemented in or by a UE, application server(s) XQ30, and/or any other element/device discussed herein. The system 700 may include one or more of application circuitry 705, baseband circuitry 710, one or more radio front end modules 715, memory 720, power management integrated circuitry (PMIC) 725, power tee circuitry 730, network controller 735, network interface connector 740, satellite positioning circuitry 745, and user interface 750. In some embodiments, the device XT00 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

As used herein, the terms "circuitry" or "circuit components" may refer to, be part of, or include hardware components such as an electronic circuit, a logic circuit, a processor (shared, dedicated, or group) and/or memory (shared, dedicated, or group), an Application Specific Integrated Circuit (ASIC), a field-programmable device (FPD), (for example, a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality. In addition, the term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The terms "application circuitry" and/or "baseband circuitry" may be considered synonymous to, and may be referred to as "processor circuitry." As used herein, the term "processor circuitry" may refer to, is part of, or includes circuitry capable of sequentially and automatically carrying out a sequence of arithmetic or logical operations; recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes.

Furthermore, the various components of the core network XQ20 (or CN XR20 discussed infra) may be referred to as "network elements." The term "network element" may describe a physical or virtualized equipment used to provide wired or wireless communication network services. The term "network element" may be considered synonymous to and/or referred to as a networked computer, networking hardware, network equipment, network node, router, switch, hub, bridge, radio network controller, radio access network device, gateway, server, virtualized network function (VNF), network functions virtualization infrastructure (NFVI), and/or the like.

Application circuitry 705 may include one or more central processing unit (CPU) cores and one or more of cache memory, low drop-out voltage regulators (LDOs), interrupt controllers, serial interfaces such as SPI, $I^2C$ or universal programmable serial interface module, real time clock (RTC), timer-counters including interval and watchdog timers, general purpose input/output (I/O or JO), memory card controllers such as Secure Digital (SD/)MultiMediaCard (MMC) or similar, Universal Serial Bus (USB) interfaces, Mobile Industry Processor Interface (MIPI) interfaces and Joint Test Access Group (JTAG) test access ports. As examples, the application circuitry 705 may include one or more Intel Pentium®, Core®, or Xeon® processor(s); Advanced Micro Devices (AMD) Ryzen® processor(s), Accelerated Processing Units (APUs), or Epyc® processors; and/or the like. In some embodiments, the system 700 may not utilize application circuitry 705, and instead may include a special-purpose processor/controller to process IP data received from an EPC or SGC, for example.

Additionally or alternatively, application circuitry 705 may include circuitry such as, but not limited to, one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 705 may comprise logic blocks or logic fabric including and other interconnected resources that may be programmed to perform various functions, such as the procedures, methods, functions, etc. of the various embodiments discussed herein. In such embodiments, the circuitry of application circuitry 705 may include memory cells (e.g., erasable programmable read-only memory (EPROM), electrically erasable programmable read-only memory (EEPROM), flash memory, static memory (e.g., static random access memory (SRAM), anti-fuses, etc.) used to store logic blocks, logic fabric, data, etc. in lookup-tables (LUTs) and the like.

The baseband circuitry 710 may be implemented, for example, as a solder-down substrate including one or more integrated circuits, a single packaged integrated circuit soldered to a main circuit board or a multi-chip module containing two or more integrated circuits. Although not shown, baseband circuitry 710 may comprise one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband sub-system via another interconnect subsystem. Each of the interconnect subsystems may include a bus system, point-to-point connections, network-on-chip (NOC) structures, and/or some other suitable bus or interconnect technology, such as those discussed herein. The audio sub-system may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 710 may include protocol processing circuitry with one or more instances of control circuitry (not shown) to provide control functions for the digital baseband circuitry and/or radio frequency circuitry (for example, the radio front end modules 715).

User interface circuitry 750 may include one or more user interfaces designed to enable user interaction with the system 700 or peripheral component interfaces designed to enable peripheral component interaction with the system 700. User interfaces may include, but are not limited to one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a non-volatile memory port, a universal serial bus (USB) port, an audio jack, a power supply interface, etc.

The radio front end modules (RFEMs) 715 may comprise a millimeter wave RFEM and one or more sub-millimeter wave radio frequency integrated circuits (RFICs). In some implementations, the one or more sub-millimeter wave RFICs may be physically separated from the millimeter wave RFEM. The RFICs may include connections to one or more antennas or antenna arrays, and the RFEM may be connected to multiple antennas. In alternative implementations, both millimeter wave and sub-millimeter wave radio functions may be implemented in the same physical radio front end module 715. The RFEMs 715 may incorporate both millimeter wave antennas and sub-millimeter wave antennas.

The memory circuitry 720 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 720 may be implemented as one or more of solder down packaged integrated circuits, socketed memory modules and plug-in memory cards.

The PMIC 725 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 730 may provide for electrical power drawn from a network cable to provide both power supply and data connectivity to the infrastructure equipment 700 using a single cable.

The network controller circuitry 735 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 700 via network interface connector 740 using a physical connection, which may be electrical (commonly referred to as a "copper interconnect"), optical, or wireless. The network controller circuitry 735 may include one or more dedicated processors and/or FPGAs to communicate using one or more of the aforementioned protocol. In some implementations, the network controller circuitry 735 may include multiple controllers to provide connectivity to other networks using the same or different protocols.

The positioning circuitry 745, which may include circuitry to receive and decode signals transmitted by one or more navigation satellite constellations of a global navigation satellite system (GNSS). Examples of navigation satellite constellations (or GNSS) may include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 745 may comprise various hardware elements (e.g., including hardware devices such as switches, filters, amplifiers, antenna elements, and the like to facilitate the communications over-the-air (OTA) communications) to communicate with components of a positioning network, such as navigation satellite constellation nodes.

Nodes or satellites of the navigation satellite constellation(s) ("GNSS nodes") may provide positioning services by continuously transmitting or broadcasting GNSS signals along a line of sight, which may be used by GNSS receivers (e.g., positioning circuitry 745 and/or positioning circuitry implemented by UEs 601, 602, or the like) to determine their GNSS position. The GNSS signals may include a pseudorandom code (e.g., a sequence of ones and zeros) that is known to the GNSS receiver and a message that includes a time of transmission (ToT) of a code epoch (e.g., a defined point in the pseudorandom code sequence) and the GNSS node position at the ToT. The GNSS receivers may monitor/measure the GNSS signals transmitted/broadcasted by a plurality of GNSS nodes (e.g., four or more satellites) and solve various equations to determine a corresponding GNSS position (e.g., a spatial coordinate). The GNSS receivers also implement clocks that are typically less stable and less precise than the atomic clocks of the GNSS nodes, and the GNSS receivers may use the measured GNSS signals to determine the GNSS receivers' deviation from true time (e.g., an offset of the GNSS receiver clock relative to the GNSS node time). In some embodiments, the positioning circuitry 745 may include a Micro-Technology for Positioning, Navigation, and Timing (Micro-PNT) IC that uses a master timing clock to perform position tracking/estimation without GNSS assistance.

The GNSS receivers may measure the time of arrivals (ToAs) of the GNSS signals from the plurality of GNSS nodes according to its own clock. The GNSS receivers may determine ToF values for each received GNSS signal from the ToAs and the ToTs, and then may determine, from the ToFs, a three-dimensional (3D) position and clock deviation. The 3D position may then be converted into a latitude, longitude and altitude. The positioning circuitry 745 may provide data to application circuitry 705 which may include one or more of position data or time data. Application circuitry 705 may use the time data to synchronize operations with other radio base stations (e.g., RAN nodes 611, XQ12, 611 or the like).

The components shown by FIG. 7 may communicate with one another using interface circuitry. As used herein, the term "interface circuitry" may refer to, is part of, or includes circuitry providing for the exchange of information between two or more components or devices. The term "interface circuitry" may refer to one or more hardware interfaces, for example, buses, input/output (110) interfaces, peripheral component interfaces, network interface cards, and/or the like. Any suitable bus technology may be used in various implementations, which may include any number of technologies, including industry standard architecture (ISA), extended ISA (EISA), peripheral component interconnect (PCI), peripheral component interconnect extended (PCIx), PCI express (PCIe), or any number of other technologies. The bus may be a proprietary bus, for example, used in a SoC based system. Other bus systems may be included, such as an I$^2$C interface, an SPI interface, point to point interfaces, and a power bus, among others.

Figure 8:
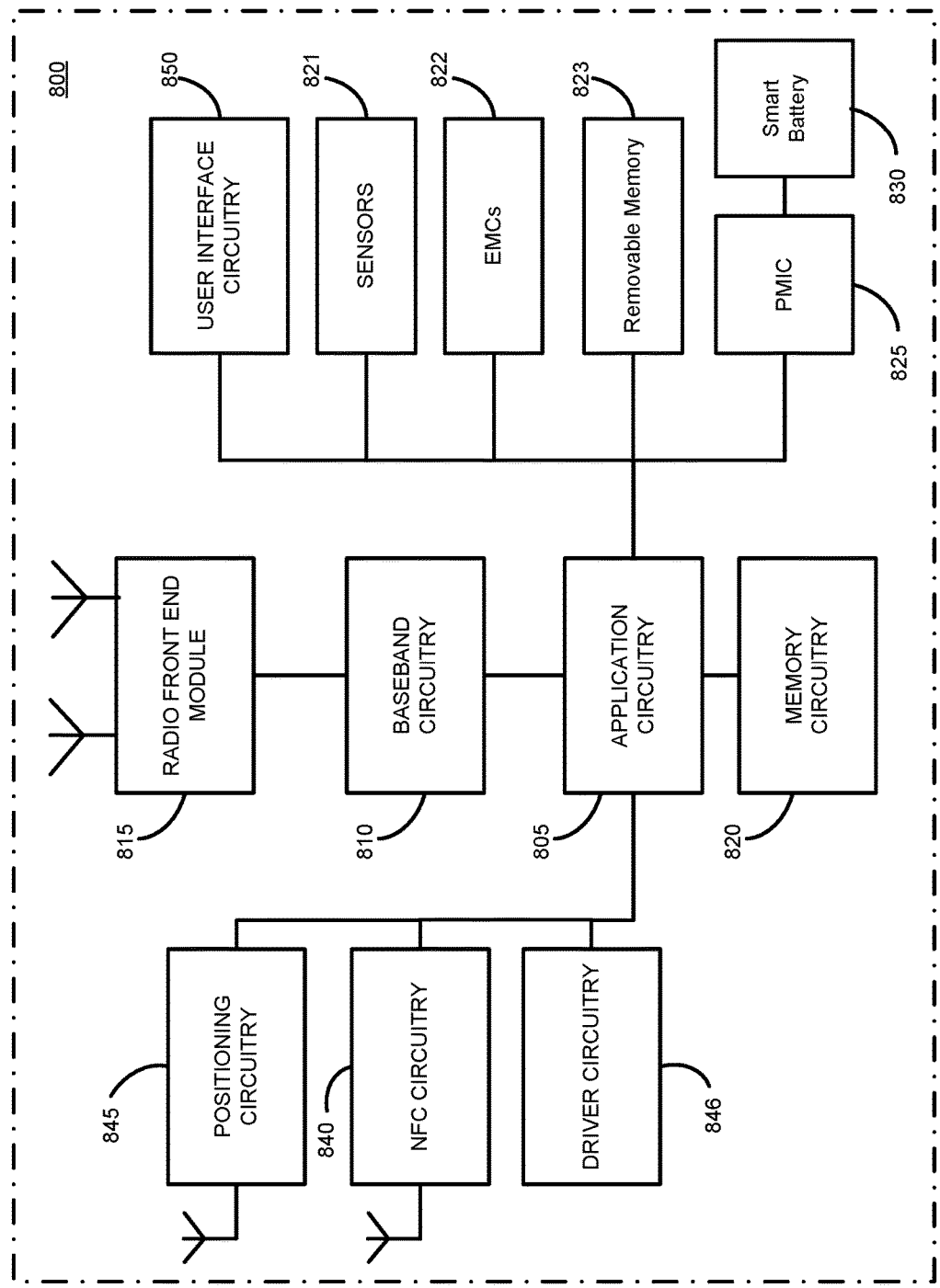
FIG. 8 illustrates an example of a platform in accordance with various embodiments.

FIG. 8 illustrates an example of a platform 800 (or "device 800") in accordance with various embodiments. In embodiments, the computer platform 800 may be suitable for use as UEs 601/602, RAN nodes 611/612 and/or any other element/device discussed herein. The platform 800 may include any combinations of the components shown in the example. The components of platform 800 may be implemented as integrated circuits (ICs), portions thereof, discrete electronic devices, or other modules, logic, hardware, software, firmware, or a combination thereof adapted in the computer platform 800, or as components otherwise incorporated within a chassis of a larger system. The block diagram of FIG. 8 is intended to show a high level view of components of the computer platform 800. However, some of the components shown may be omitted, additional components may be present, and different arrangement of the components shown may occur in other implementations.

The application circuitry 805 may include circuitry such as, but not limited to single-core or multi-core processors and one or more of cache memory, low drop-out voltage regulators (LDOs), interrupt controllers, serial interfaces such as serial peripheral interface (SPI), inter-integrated circuit (I$^2$C) or universal programmable serial interface circuit, real time clock (RTC), timer-counters including interval and watchdog timers, general purpose input-output (10), memory card controllers such as secure digital/multimedia card (SD/MMC) or similar, universal serial bus (USB) interfaces, mobile industry processor interface (MIPI) interfaces and Joint Test Access Group (JTAG) test access ports. The processor(s) may include any combination of general-purpose processors and/or dedicated processors (e.g., graphics processors, application processors, etc.). The processors (or cores) may be coupled with or may include memory/storage and may be configured to execute instructions stored in the memory/storage to enable various applications or operating systems to run on the platform 800. In some embodiments, processors of application circuitry 805 may process IP data packets received from an EPC or SGC.

Application circuitry 805 be or include a microprocessor, a multi-core processor, a multithreaded processor, an ultra-low voltage processor, an embedded processor, or other known processing element. In one example, the application circuitry 805 may include an Intel® Architecture Core™ based processor, such as a Quark™, an Atom™, an i3, an i5, an i7, or an MCU-class processor, or another such processor available from Intel® Corporation, Santa Clara, Calif. The processors of the application circuitry 805 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc; an ARM-based design licensed from ARM Holdings, Ltd.; or the like. In some implementations, the application circuitry 805 may be a part of a system on a chip (SoC) in which the application circuitry 805 and other components are formed into a single integrated circuit, or a single package, such as the Edison™ or Galileo™ SoC boards from Intel® Corporation.

Additionally or alternatively, application circuitry 805 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 805 may comprise logic blocks or logic fabric including and other interconnected resources that may be programmed to perform various functions, such as the procedures, methods, functions, etc. of the various embodiments discussed herein. In such embodiments, the circuitry of application circuitry 805 may include memory cells (e.g., erasable programmable read-only memory (EPROM), electrically erasable programmable read-only memory (EEPROM), flash memory, static memory (e.g., static random access memory (SRAM), anti-fuses, etc.) used to store logic blocks, logic fabric, data, etc. in lookup-tables (LUTs) and the like.

The baseband circuitry 810 may be implemented, for example, as a solder-down substrate including one or more integrated circuits, a single packaged integrated circuit soldered to a main circuit board or a multi-chip module containing two or more integrated circuits. Although not shown, baseband circuitry 810 may comprise one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband sub-system via another interconnect subsystem. Each of the interconnect subsystems may include a bus system, point-to-point connections, network-on-chip (NOC) structures, and/or some other suitable bus or interconnect technology, such as those discussed herein. The audio sub-system may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 810 may include protocol processing circuitry with one or more instances of control circuitry (not shown) to provide control functions for the digital baseband circuitry and/or radio frequency circuitry (for example, the radio front end modules 815).

The radio front end modules (RFEMs) 815 may comprise a millimeter wave RFEM and one or more sub-millimeter wave radio frequency integrated circuits (RFICs). In some implementations, the one or more sub-millimeter wave RFICs may be physically separated from the millimeter wave RFEM. The RFICs may include connections to one or more antennas or antenna arrays, and the RFEM may be connected to multiple antennas. In alternative implementations, both millimeter wave and sub-millimeter wave radio functions may be implemented in the same physical radio front end module 815. The RFEMs 815 may incorporate both millimeter wave antennas and sub-millimeter wave antennas.

In various embodiments, the components of the transmit circuitry that are to provide the UL NOMA schemes described in FIGS. 1-5 may be circuitry disposed in the baseband circuitry 710/810 or the RFEM 715/815.

The memory circuitry 820 may include any number and type of memory devices used to provide for a given amount of system memory. As examples, the memory circuitry 820 may include one or more of volatile memory including be random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 820 may be developed in accordance with a Joint Electron Devices Engineering Council (JEDEC) low power double data rate (LPDDR)-based design, such as LPDDR2, LPDDR3, LPDDR4, or the like. Memory circuitry XS20 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 820 may be on-die memory or registers associated with the application circuitry 805. To provide for persistent storage of information such as data, applications, operating systems and so forth, memory circuitry 820 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 800 may incorporate the three-dimensional (3D) cross-point (XPOINT) memories from Intel® and Micron®.

Removable memory circuitry 823 may include devices, circuitry, enclosures/housings, ports or receptacles, etc. used to coupled portable data storage devices with the platform 800. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 800 may also include interface circuitry (not shown) that is used to connect external devices with the platform 800. The external devices connected to the platform 800 via the interface circuitry may include sensors 821, such as accelerometers, level sensors, flow sensors, temperature sensors, pressure sensors, barometric pressure sensors, and the like. The interface circuitry may be used to connect the platform 800 to electro-mechanical components (EMCs) 822, which may allow platform 800 to change its state, position, and/or orientation, or move or control a mechanism or system. The EMCs 822 may include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 800 may be configured to operate one or more EMCs 822 based on one or more captured events and/or instructions or control signals received from a service provider and/or various clients.

In some implementations, the interface circuitry may connect the platform 800 with positioning circuitry 845, which may be the same or similar as the positioning circuitry 845 discussed with regard to FIG. XS.

In some implementations, the interface circuitry may connect the platform 800 with near-field communication (NFC) circuitry 840, which may include an NFC controller coupled with an antenna element and a processing device. The NFC circuitry 840 may be configured to read electronic tags and/or connect with another NFC-enabled device.

The driver circuitry 846 may include software and hardware elements that operate to control particular devices that are embedded in the platform 800, attached to the platform 800, or otherwise communicatively coupled with the platform 800. The driver circuitry 846 may include individual drivers allowing other components of the platform 800 to interact or control various input/output (I/O) devices that may be present within, or connected to, the platform 800. For example, driver circuitry 846 may include a display driver to control and allow access to a display device, a touchscreen driver to control and allow access to a touchscreen interface of the platform 800, sensor drivers to obtain sensor readings of sensors 821 and control and allow access to sensors 821, EMC drivers to obtain actuator positions of the EMCs 822 and/or control and allow access to the EMCs 822, a camera driver to control and allow access to an embedded image capture device, audio drivers to control and allow access to one or more audio devices.

The power management integrated circuitry (PMIC) 825 (also referred to as "power management circuitry 825") may manage power provided to various components of the platform 800. In particular, with respect to the baseband circuitry 810, the PMIC 825 may control power-source selection, voltage scaling, battery charging, or DC-to-DC conversion. The PMIC 825 may often be included when the platform 800 is capable of being powered by a battery 830, for example, when the device is included in a UE XQ01, XQ02, XR01.

In some embodiments, the PMIC 825 may control, or otherwise be part of, various power saving mechanisms of the platform 800. For example, if the platform 800 is in an RRC Connected state, where it is still connected to the RAN node as it expects to receive traffic shortly, then it may enter a state known as Discontinuous Reception Mode (DRX) after a period of inactivity. During this state, the platform 800 may power down for brief intervals of time and thus save power. If there is no data traffic activity for an extended period of time, then the platform 800 may transition off to an RRC Idle state, where it disconnects from the network and does not perform operations such as channel quality feedback, handover, etc. The platform 800 goes into a very low power state and it performs paging where again it periodically wakes up to listen to the network and then powers down again. The platform 800 may not receive data in this state, in order to receive data, it must transition back to RRC Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 830 may power the platform 800, although in some examples the platform 800 may be mounted deployed in a fixed location, and may have a power supply coupled to an electrical grid. The battery 830 may be a lithium ion battery, a metal-air battery, such as a zinc-air battery, an aluminum-air battery, a lithium-air battery, and the like. In some implementations, such as in V2X applications, the battery 830 may be a typical lead-acid automotive battery.

In some implementations, the battery 830 may be a "smart battery," which includes or is coupled with a Battery Management System (BMS) or battery monitoring integrated circuitry. The BMS may be included in the platform 800 to track the state of charge (SoCh) of the battery 830. The BMS may be used to monitor other parameters of the battery 830 to provide failure predictions, such as the state of health (SoH) and the state of function (SoF) of the battery 830. The BMS may communicate the information of the battery 830 to the application circuitry 805 or other components of the platform 800. The BMS may also include an analog-to-digital (ADC) convertor that allows the application circuitry 805 to directly monitor the voltage of the battery 830 or the current flow from the battery 830. The battery parameters may be used to determine actions that the platform 800 may perform, such as transmission frequency, network operation, sensing frequency, and the like.

A power block, or other power supply coupled to an electrical grid may be coupled with the BMS to charge the battery 830. In some examples, the power block XQ28 may be replaced with a wireless power receiver to obtain the power wirelessly, for example, through a loop antenna in the computer platform 800. In these examples, a wireless battery charging circuit may be included in the BMS. The specific charging circuits chosen may depend on the size of the battery 830, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

Although not shown, the components of platform 800 may communicate with one another using a suitable bus technology, which may include any number of technologies, including industry standard architecture (ISA), extended ISA (EISA), peripheral component interconnect (PCI), peripheral component interconnect extended (PCIx), PCI express (PCIe), a Time-Trigger Protocol (TTP) system, or a FlexRay system, or any number of other technologies. The bus may be a proprietary bus, for example, used in a SoC based system. Other bus systems may be included, such as an I²C interface, an SPI interface, point to point interfaces, and a power bus, among others.

Figure 9:
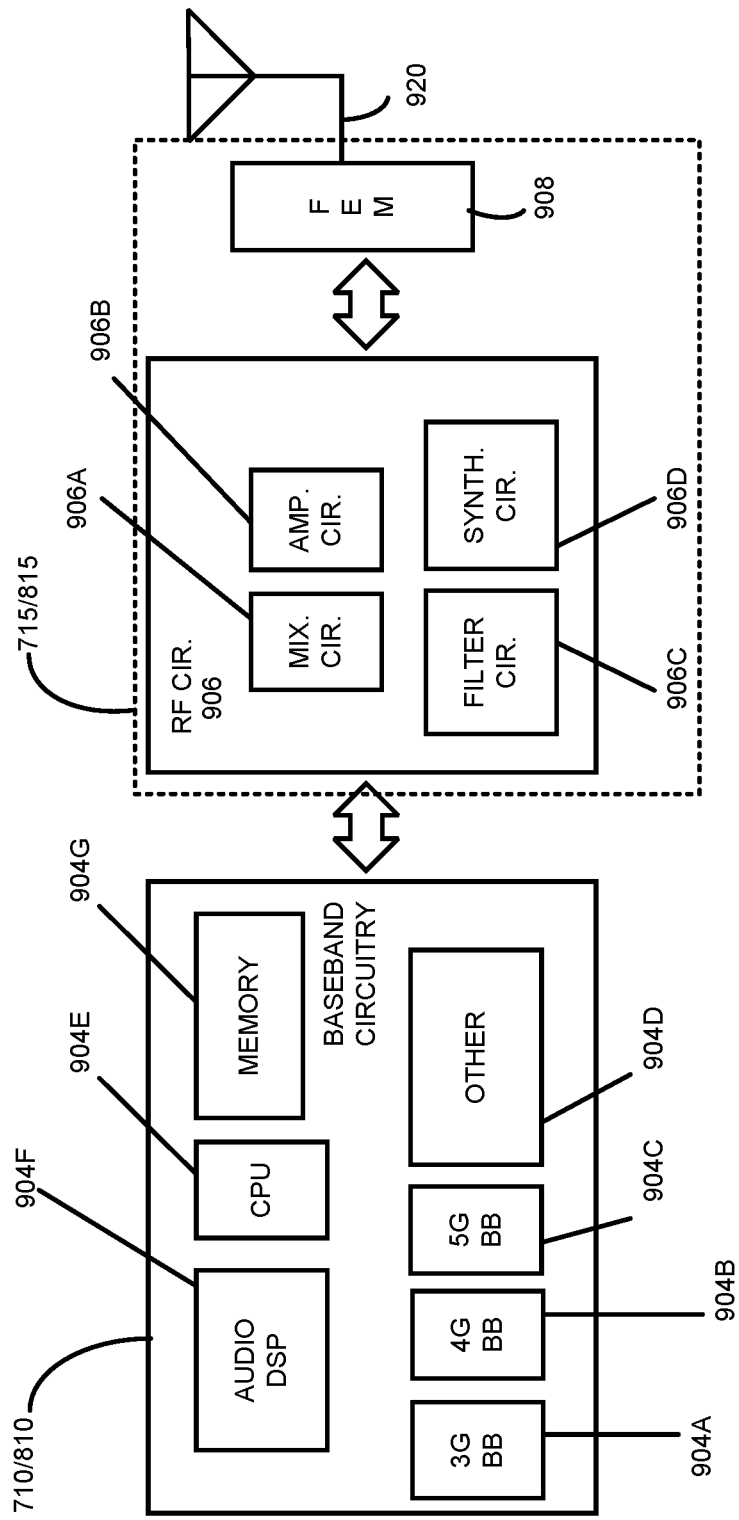
FIG. 9 illustrates example components of baseband circuitry and radio front end modules in accordance with various embodiments.

FIG. 9 illustrates example components of baseband circuitry 710/810 and radio front end modules (RFEM) 715/815 in accordance with some embodiments. As shown, the RFEM 715/815 may include Radio Frequency (RF) circuitry 906, front-end module (FEM) circuitry 908, one or more antennas 910 coupled together at least as shown.

The baseband circuitry 710/810 may include circuitry such as, but not limited to, one or more single-core or multi-core processors. The baseband circuitry 710/810 may include one or more baseband processors or control logic to process baseband signals received from a receive signal path of the RF circuitry 906 and to generate baseband signals for a transmit signal path of the RF circuitry 906. Baseband processing circuitry 710/810 may interface with the application circuitry 705/805 for generation and processing of the baseband signals and for controlling operations of the RF circuitry 906. For example, in some embodiments, the baseband circuitry 710/810 may include a third generation (3G) baseband processor 904A, a fourth generation (4G) baseband processor 904B, a fifth generation (5G) baseband processor 904C, or other baseband processor(s) 904D for other existing generations, generations in development or to be developed in the future (e.g., second generation (2G), sixth generation (6G), etc.). The baseband circuitry 710/810 (e.g., one or more of baseband processors 904A-D) may handle various radio control functions that enable communication with one or more radio networks via the RF circuitry 906. In other embodiments, some or all of the functionality of baseband processors 904A-D may be included in modules stored in the memory 904G and executed via a Central Processing Unit (CPU) 904E. The radio control functions may include, but are not limited to, signal modulation/demodulation, encoding/decoding, radio frequency shifting, etc. In some embodiments, modulation/demodulation circuitry of the baseband circuitry 710/810 may include Fast-Fourier Transform (FFT), precoding, or constellation mapping/demapping functionality. In some embodiments, encoding/decoding circuitry of the baseband circuitry 710/810 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 710/810 may include one or more audio digital signal processor(s) (DSP) 904F. The audio DSP(s) 904F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 710/810 and the application circuitry 705/805 may be implemented together such as, for example, on a system on a chip (SOC).

In some embodiments, the baseband circuitry 710/810 may provide for communication compatible with one or more radio technologies. For example, in some embodiments, the baseband circuitry 710/810 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 710/810 is configured to support radio communications of more than one wireless protocol may be referred to as multi-mode baseband circuitry.

RF circuitry 906 may enable communication with wireless networks using modulated electromagnetic radiation through a non-solid medium. In various embodiments, the RF circuitry 806 may include switches, filters, amplifiers, etc. to facilitate the communication with the wireless network. RF circuitry 906 may include a receive signal path which may include circuitry to down-convert RF signals received from the FEM circuitry 908 and provide baseband signals to the baseband circuitry 710/810. RF circuitry 906 may also include a transmit signal path which may include circuitry to up-convert baseband signals provided by the baseband circuitry 710/810 and provide RF output signals to the FEM circuitry 908 for transmission.

In some embodiments, the receive signal path of the RF circuitry 906 may include mixer circuitry 906a, amplifier circuitry 906b and filter circuitry 906c. In some embodiments, the transmit signal path of the RF circuitry 906 may include filter circuitry 906c and mixer circuitry 906a. RF circuitry 906 may also include synthesizer circuitry 906d for synthesizing a frequency for use by the mixer circuitry 906a of the receive signal path and the transmit signal path. In some embodiments, the mixer circuitry 906a of the receive signal path may be configured to down-convert RF signals received from the FEM circuitry 908 based on the synthesized frequency provided by synthesizer circuitry 906d. The amplifier circuitry 906b may be configured to amplify the down-converted signals and the filter circuitry 906c may be a low-pass filter (LPF) or band-pass filter (BPF) configured to remove unwanted signals from the down-converted signals to generate output baseband signals. Output baseband signals may be provided to the baseband circuitry 710/810 for further processing. In some embodiments, the output baseband signals may be zero-frequency baseband signals, although this is not a requirement. In some embodiments, mixer circuitry 906a of the receive signal path may comprise passive mixers, although the scope of the embodiments is not limited in this respect.

In some embodiments, the mixer circuitry 906a of the transmit signal path may be configured to up-convert input baseband signals based on the synthesized frequency provided by the synthesizer circuitry 906d to generate RF output signals for the FEM circuitry 908. The baseband signals may be provided by the baseband circuitry 710/810 and may be filtered by filter circuitry 906c.

In some embodiments, the mixer circuitry 906a of the receive signal path and the mixer circuitry 906a of the transmit signal path may include two or more mixers and may be arranged for quadrature downconversion and upconversion, respectively. In some embodiments, the mixer circuitry 906a of the receive signal path and the mixer circuitry 906a of the transmit signal path may include two or more mixers and may be arranged for image rejection (e.g., Hartley image rejection). In some embodiments, the mixer circuitry 906a of the receive signal path and the mixer circuitry 906a may be arranged for direct downconversion and direct upconversion, respectively. In some embodiments, the mixer circuitry 906a of the receive signal path and the mixer circuitry 906a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 906 may include analog-to-digital converter (ADC) and digital-to-analog converter (DAC) circuitry and the baseband circuitry 710/810 may include a digital baseband interface to communicate with the RF circuitry 906.

In some dual-mode embodiments, a separate radio IC circuitry may be provided for processing signals for each spectrum, although the scope of the embodiments is not limited in this respect.

In some embodiments, the synthesizer circuitry 906d may be a fractional-N synthesizer or a fractional N/N+1 synthesizer, although the scope of the embodiments is not limited in this respect as other types of frequency synthesizers may be suitable. For example, synthesizer circuitry 906d may be a delta-sigma synthesizer, a frequency multiplier, or a synthesizer comprising a phase-locked loop with a frequency divider.

The synthesizer circuitry 906d may be configured to synthesize an output frequency for use by the mixer circuitry 906a of the RF circuitry 906 based on a frequency input and a divider control input. In some embodiments, the synthesizer circuitry 906d may be a fractional N/N+1 synthesizer.

In some embodiments, frequency input may be provided by a voltage controlled oscillator (VCO), although that is not a requirement. Divider control input may be provided by either the baseband circuitry 710/810 or the applications processor 705/805 depending on the desired output frequency. In some embodiments, a divider control input (e.g., N) may be determined from a look-up table based on a channel indicated by the applications processor 705/805.

Synthesizer circuitry 906d of the RF circuitry 906 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 906d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 906 may include an IQ/polar converter.

FEM circuitry 908 may include a receive signal path which may include circuitry configured to operate on RF signals received from one or more antennas 810, amplify the received signals and provide the amplified versions of the received signals to the RF circuitry 906 for further processing. FEM circuitry 908 may also include a transmit signal path which may include circuitry configured to amplify signals for transmission provided by the RF circuitry 906 for transmission by one or more of the one or more antennas 810. In various embodiments, the amplification through the transmit or receive signal paths may be done solely in the RF circuitry 906, solely in the FEM 908, or in both the RF circuitry 906 and the FEM 908.

In some embodiments, the FEM circuitry 908 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 906). The transmit signal path of the FEM circuitry 908 may include a power amplifier (PA) to amplify input RF signals (e.g., provided by RF circuitry 906), and one or more filters to generate RF signals for subsequent transmission (e.g., by one or more of the one or more antennas 810).

Processors of the application circuitry 705/805 and processors of the baseband circuitry 710/810 may be used to execute elements of one or more instances of a protocol stack. For example, processors of the baseband circuitry 710/810, alone or in combination, may be used execute Layer 3, Layer 2, or Layer 1 functionality, while processors of the baseband circuitry 710/810 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 10:
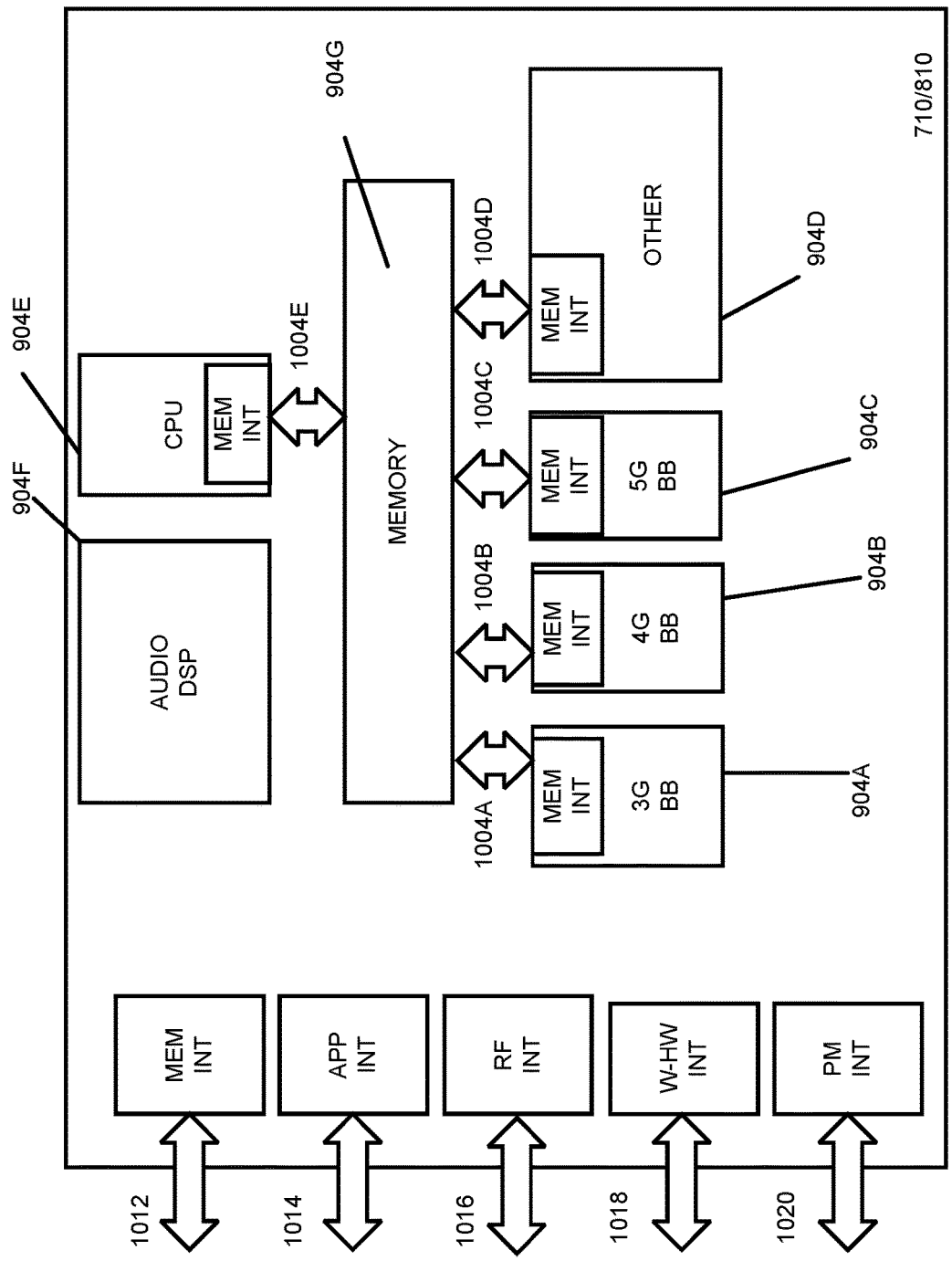
FIG. 10 illustrates example interfaces of baseband circuitry in accordance with some embodiments.

FIG. 10 illustrates example interfaces of baseband circuitry in accordance with some embodiments. As discussed above, the baseband circuitry 710/810 of FIGS. 7/8 may comprise processors 904A-904E and a memory 904G utilized by said processors. Each of the processors 904A-904E may include a memory interface, 1004A-1004E, respectively, to send/receive data to/from the memory 904G.

The baseband circuitry 710/810 may further include one or more interfaces to communicatively couple to other circuitries/devices, such as a memory interface 1012 (e.g., an interface to send/receive data to/from memory external to the baseband circuitry 710/810), an application circuitry interface 1014 (e.g., an interface to send/receive data to/from the application circuitry 705/805 of FIGS. 7-8), an RF circuitry interface 1016 (e.g., an interface to send/receive data to/from RF circuitry 906 of FIG. 9), a wireless hardware connectivity interface XU18 (e.g., an interface to send/receive data to/from Near Field Communication (NFC) components, Bluetooth® components (e.g., Bluetooth® Low Energy), Wi-Fi® components, and other communication components), and a power management interface 1020 (e.g., an interface to send/receive power or control signals to/from a power management integrated circuit.

Figure 11:
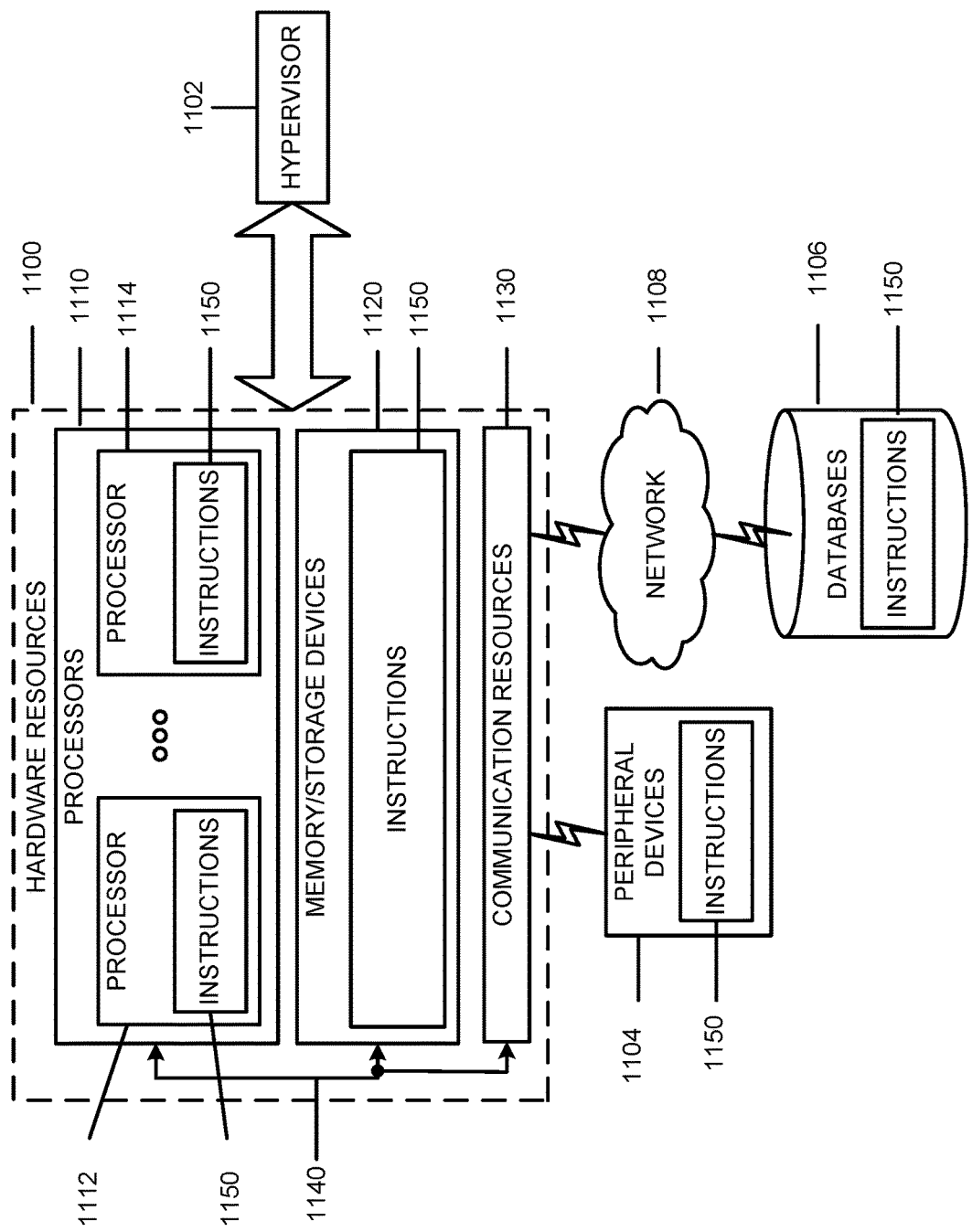
FIG. 11 is a block diagram illustrating components, according to some example embodiments, able to read instructions from a machine-readable or computer-readable medium (e.g., a non-transitory machine-readable storage medium) and perform any one or more of the methodologies discussed herein.

FIG. 11 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 11 shows a diagrammatic representation of hardware resources 1100 including one or more processors (or processor cores) 1110, one or more memory/storage devices 1120, and one or more communication resources 1130, each of which may be communicatively coupled via a bus 1140. As used herein, the term "computing resource", "hardware resource", etc., may refer to a physical or virtual device, a physical or virtual component within a computing environment, and/or physical or virtual component within a particular device, such as computer devices, mechanical devices, memory space, processor/CPU time and/or processor/CPU usage, processor and accelerator loads, hardware time or usage, electrical power, input/output operations, ports or network sockets, channel/link allocation, throughput, memory usage, storage, network, database and applications, and/or the like. For embodiments where node virtualization (e.g., NFV) is utilized, a hypervisor 1102 may be executed to provide an execution environment for one or more network slices/subslices to utilize the hardware resources 1100. A "virtualized resource" may refer to compute, storage, and/or network resources provided by virtualization infrastructure to an application, device, system, etc.

The processors 1110 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1112 and a processor 1114.

The memory/storage devices 1120 may include main memory, disk storage, or any suitable combination thereof. The memory/storage devices 1120 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1130 may include interconnection or network interface components or other suitable devices to communicate with one or more peripheral devices 1104 or one or more databases 1106 via a network 1108. For example, the communication resources 1130 may include wired communication components (e.g., for coupling via a Universal Serial Bus (USB)), cellular communication components, NFC components, Bluetooth® components (e.g., Bluetooth® Low Energy), Wi-Fi® components, and other communication components. As used herein, the term "network resource" or "communication resource" may refer to computing resources that are accessible by computer devices via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

Instructions 1150 may comprise software, a program, an application, an applet, an app, or other executable code for causing at least any of the processors 1110 to perform any one or more of the methodologies discussed herein. For example, the instructions 1150 may cause the processors 1110 to perform one or more of the uplink processing operations described above with respect to FIGS. 1-5.

The instructions 1150 may reside, completely or partially, within at least one of the processors 1110 (e.g., within the processor's cache memory), the memory/storage devices 1120, or any suitable combination thereof. Furthermore, any portion of the instructions 1150 may be transferred to the hardware resources 1100 from any combination of the peripheral devices 1104 or the databases 1106. Accordingly, the memory of processors 1110, the memory/storage devices 1120, the peripheral devices 1104, and the databases 1106 are examples of computer-readable and machine-readable media.

In some embodiments, the electronic device(s), network(s), system(s), chip(s) or component(s), or portions or implementations thereof, of figures herein may be configured to perform one or more processes, techniques, or methods as described herein, or portions thereof.

EXAMPLES

Example 1 may include a method of wireless communication for a fifth generation (5G) or new radio (NR) system, comprising:
transmitting, by a UE, a physical uplink shared channel (PUSCH) in accordance with a transmission scheme for an uplink non-orthogonal multiple access (NOMA) scheme.

Example 2 may include the method of example 1 or some other example herein, wherein a two-part scrambling operation is employed for the UL NOMA transmission, wherein scrambling in the first part is applied after encoding operation and scrambling in the second part is applied after the spreading operation.

Example 3 may include the method of example 2 or some other example herein, wherein for the first-part scrambling, the scrambling sequence is generated similar to PUSCH scrambling sequence generation.

Example 4 may include the method of example 2 or some other example herein, wherein for the first-part, the scrambling sequence is initialized as $$C_{init} = n_{DMRS} \cdot 2^{15} + n_{ID}^{cell}$$

wherein $n_{DMRS}$ can be DeModulation Reference Signal (DM-RS) sequence index or DM-RS antenna port (AP) index associated with UL NOMA data transmission and $n_{ID}^{cell}$ is the cell ID.

Example 5 may include the method of example 2 or some other example herein, wherein for the second-part scrambling, QPSK modulation is employed after the pseudo noise (PN) sequence generation, and wherein the PN sequence is initialized as a function of one or more following parameters: UE ID (e.g., C-RNTI), DM-RS AP index, physical or virtual cell ID, resource ID in case when multiple resources are used for UL NOMA transmission, and symbol/slot/frame index.

Example 6 may include the method of example 2 or some other example herein, wherein the second-part scrambling sequence is generated per-symbol basis.

Example 7 may include the method of example 1 or some other example herein, wherein a one-part scrambling operation is applied for UL NOMA transmission, and wherein scrambling operation is applied after spreading.

Example 8 may include the method of example 1 or some other example herein, wherein interleaver is applied after spreading operation.

Example 9 may include the method of example 1 or some other example herein, wherein two-part interleaver is applied, and wherein the first-part interleaver is applied right after channel coding and the second-part interleaver is employed after spreading operation.

Example 10 may include the method of example 1 or some other example herein, wherein block-wised orthogonal cover code is applied prior to Discrete Fourier transform (DFT) operation.

Example 11 may include an apparatus comprising: encoder circuitry to receive data to be transmitted in an uplink (UL) non-orthogonal multiple access (NOMA) data transmission and encode the data with a channel code to generate an encoded sequence; first scrambling circuitry to perform first-part scrambling on the encoded sequence to generate a first scrambled sequence; modulating circuitry to generate modulated symbols based on the first scrambled sequence; spreading circuitry to spread the modulated symbols; and second scrambling circuitry to perform second-part scrambling on the spread modulated symbols to generate a second scrambled sequence.

Example 12 may include the apparatus of example 11 or some other example herein, wherein to perform the first-part scrambling the first scrambling circuitry is to:
initialize a scrambling sequence as $C_{init} = n_{DMRS} \cdot 2^{15} + n_{ID}^{cell}$, wherein $n_{DMRS}$ is a demodulation reference signal (DM-RS) sequence index or a DM-RS antenna port (AP) index associated with the UL NOMA data transmission and $n_{ID}^{cell}$ is an identifier of a cell in which the UL NOMA data transmission is to occur; and use the scrambling sequence to generate the first scrambled sequence.

Example 13 may include the apparatus of example 11 or some other example herein, wherein to perform the second-part scrambling the second scrambling circuitry is to initialize a pseudo noise (PN) sequence based on a user equipment (UE) identifier, a demodulation reference signal antenna port index, a physical cell identifier, a virtual cell identifier, a resource identifier, a symbol index, a slot index, or a frame index; modulate the PN sequence with a quadrature phase shift keying modulation to provide a PN modulated sequence; and use the PN modulated sequence to generate the second scrambled sequence.

Example 14 may include the apparatus of example 11 or some other example herein, wherein to perform the second-part scrambling the second scrambling circuitry is to: generate a second-part scrambling sequence on a per-symbol basis.

Example 15 may include the apparatus of example 14 or some other example herein, wherein to generate the second-part scrambling sequence on the per-symbol basis the second scrambling sequence is to: initialize the second-part scrambling sequence based on a symbol index within a slot for the UL NOMA data transmission.

Example 16 may include the apparatus of example 11 or some other example herein, further comprising: interleaving circuitry to interleave the first scrambled sequence to generate an interleaved sequence, wherein the modulating circuitry is to generate the modulated symbols based on the interleaved sequence.

Example 17 may include an apparatus comprising: a plurality of circuit components to perform initial processing operations on data to be transmitted in an uplink (UL) non-orthogonal multiple access (NOMA) data transmission, the plurality of circuit components to include a spreader to spread modulated symbols; and a scrambler, coupled with the spreader to receive the spread modulated symbols, the scrambler to generate a scrambled sequence based on the spread modulated symbols.

Example 18 may include the apparatus of example 17 or some other example herein, wherein the scrambler is to: initialize a scrambling sequence as $C_{init} = n_{DMRS} \cdot 2^{15} + n_{ID}^{cell}$, wherein $n_{DMRS}$ is a demodulation reference signal (DM-RS) sequence index or a DM-RS antenna port (AP) index associated with the UL NOMA data transmission and $n_{ID}^{cell}$ is an identifier of a cell in which the UL NOMA data transmission is to occur; and use the scrambling sequence to generate the scrambled sequence.

Example 19 may include the apparatus of example 17 or some other example herein, wherein the scrambler is to: initialize a pseudo noise (PN) sequence based on a user equipment (UE) identifier, a demodulation reference signal antenna port index, a physical cell identifier, a virtual cell identifier, a resource identifier, a symbol index, a slot index, or a frame index; modulate the PN sequence with a quadrature phase shift keying modulation to provide a PN modulated sequence; and use the PN modulated sequence to generate the scrambled sequence.

Example 20 may include the apparatus of example 17 or some other example herein, wherein the scrambler is to: generate a scrambling sequence on a per-symbol basis; and use the scrambling sequence to generate the scrambled sequence.

Example 21 may include the apparatus of claim 20, wherein, to generate the scrambling sequence on a per-symbol basis, the scrambler is to initialize the scrambling sequence based on a symbol index within a slot for the UL NOMA data transmission.

Example 22 may include an apparatus comprising: a plurality of circuit components to perform initial processing operations on data to be transmitted in an uplink (UL) non-orthogonal multiple access (NOMA) data transmission, the plurality of circuit components to include a spreader to spread modulated symbols; and an interleaver, coupled with the spreader to receive the spread modulated symbols, the interleaver to generate an interleaved sequence based on the spread modulated symbols.

Example 23 may include the apparatus of example 22 or some other example herein, wherein the interleaver is a UE-specific interleaver.

Example 24 may include the apparatus of claim 23 or some other example herein, wherein the UE-specific interleave is to generate the interleaved sequence based on a user equipment identity, a demodulation reference signal antenna port index, a physical cell identifier, a virtual cell identifier, or a resource identifier.

Example 25 may include the apparatus of claim 22 or some other example herein, wherein the interleaver is a random or pseudo-random interleaver.

Example 26 may include the apparatus of claim 22 or some other example herein, wherein the interleaver is a second-part interleaver, the interleaved sequence is a second-part interleaved sequence, and the plurality of circuit components include: an encoder to generate an encoded sequence; and a first-part interleaver, coupled with the encoder to receive the encoded sequence, the first-part interleaver to generate a first-part interleaved sequence.

Example 27 may include an apparatus comprising: a plurality of circuit components to perform initial processing operations on data to be transmitted in an uplink (UL) non-orthogonal multiple access (NOMA) data transmission, the plurality of circuit components to include a modulator to generate modulated symbols; and a spreader, coupled with the modulator to receive the modulated symbols, the spreader to apply a block-wised orthogonal cover code to the modulated symbols.

Example 28 may include the apparatus of claim 27 or some other example herein, wherein the modulated symbols are given by d (0), . . . , d ($M_{sym}$−1), where $M_{sym}$ is a number of the modulated symbols, and the spreader is to output $$y(l \cdot M_{sc} + k) = w_n(k) \cdot d\left(\frac{lM_{sc}}{N_{SF}} + k \bmod \frac{M_{sc}}{N_{SF}}\right),$$

where k is a subcarrier index, l is a symbol index, $M_{sc}$ is a number of subcarriers for data transmission, $N_{SF}$ is a spreading factor, and $w_n(k)$ is a block-wised spreading sequence.

Example 29 may include the apparatus of example 28 or some other example herein, wherein the spreading factor is 2, 4, or 8.

Example 30 may include the apparatus of example 28 or some other example herein, wherein the block-wise spreading sequence is given by $$\begin{bmatrix} \exp\left(\frac{0 \cdot 0 \cdot j2\pi}{N_{SF}}\right) & \exp\left(\frac{1 \cdot 0 \cdot j2\pi}{N_{SF}}\right) & \cdots & \exp\left(\frac{(N_{SF}-1) \cdot 0 \cdot j2\pi}{N_{SF}}\right) \\ \exp\left(\frac{0 \cdot 1 \cdot j2\pi}{N_{SF}}\right) & \exp\left(\frac{1 \cdot 1 \cdot j2\pi}{N_{SF}}\right) & \cdots & \exp\left(\frac{(N_{SF}-1) \cdot 1 \cdot j2\pi}{N_{SF}}\right) \\ \vdots & \vdots & \ddots & \vdots \\ \exp\left(\frac{0 \cdot (N_{SF}-1) \cdot j2\pi}{N_{SF}}\right) & \exp\left(\frac{1 \cdot (N_{SF}-1) \cdot j2\pi}{N_{SF}}\right) & \cdots & \exp\left(\frac{(N_{SF}-1) \cdot (N_{SF}-1) \cdot j2\pi}{N_{SF}}\right) \end{bmatrix} \otimes w_0,$$

where $w_0$ is a vector with length $M_{sc}/N_{SF}$.

Example 31 may include may include an apparatus comprising means to perform one or more elements of a method described in or related to any of examples 1-30, or any other method or process described herein.

Example 32 may include one or more non-transitory computer-readable media comprising instructions to cause an electronic device, upon execution of the instructions by one or more processors of the electronic device, to perform one or more elements of a method described in or related to any of examples 1-30, or any other method or process described herein.

Example 33 may include an apparatus comprising logic, modules, or circuitry to perform one or more elements of a method described in or related to any of examples 1-30, or any other method or process described herein.

Example 34 may include a method, technique, or process as described in or related to any of examples 1-30, or portions or parts thereof.

Example 35 may include an apparatus comprising: one or more processors and one or more computer readable media comprising instructions that, when executed by the one or more processors, cause the one or more processors to perform the method, techniques, or process as described in or related to any of examples 1-30, or portions thereof.

Example 36 may include a signal as described in or related to any of examples 1-30, or portions or parts thereof.

Example 37 may include a signal in a wireless network as shown and described herein.

Example 38 may include a method of communicating in a wireless network as shown and described herein.

Example 39 may include a system for providing wireless communication as shown and described herein.

Example 40 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

What is claimed is:

1. A user equipment (UE) comprising:
encoder circuitry to receive data to be transmitted in an uplink (UL) non-orthogonal multiple access (NOMA) data transmission from the UE to a base station and encode the data with a channel code to generate an encoded sequence;

first scrambling circuitry to perform first-part scrambling on the encoded sequence based on a first scrambling sequence to generate a first scrambled sequence, wherein the first scrambling sequence is initialized based on a physical cell identifier for a cell associated with the UE;

modulating circuitry to generate modulated symbols based on the first scrambled sequence;

spreading circuitry to spread the modulated symbols; and second scrambling circuitry to perform second-part scrambling on the spread modulated symbols based on a second scrambling sequence to generate a second scrambled sequence, wherein the second scrambling sequence includes a pseudo noise (PN) modulated sequence that is generated based on a PN sequence, wherein the PN sequence is initialized based on a UE identifier, and a constant $\Delta$ that is predefined or configured based on a minimum system information (MSI) or configured based on a remaining minimum system information (RMSI).

2. The UE of claim 1, wherein to perform the second-part scrambling, the second scrambling circuitry is to:

initialize the PN sequence based on the user UE identifier, the constant $\Delta$, and at least one of a demodulation reference signal antenna port index, a physical cell identifier, a virtual cell identifier, a resource identifier, a symbol index, a slot index, or a frame index;

modulate the PN sequence with a quadrature phase shift keying modulation to provide the PN modulated sequence; and use the PN modulated sequence to generate the second scrambled sequence.

3. The UE of claim 2, wherein the PN sequence is initialized based on a demodulation reference signal (DM-RS) sequence index, a DM-RS antenna port (AP) index associated with the UL NOMA data transmission, or a preamble index for a physical random access channel (PRACH) transmission associated with the UL NOMA data transmission.

4. The UE of claim 2, wherein the constant $\Delta$ used to initialize the PN sequence is predefined.

5. The UE of claim 2, wherein the constant $\Delta$ used to initialize the PN sequence is configured by higher layers.

6. The UE of claim 5, wherein the constant $\Delta$ is configured by radio resource control (RRC) signaling.

7. The UE of claim 1, wherein to perform the second-part scrambling, the second scrambling circuitry is to: generate the second scrambling sequence on a per-symbol basis.

8. The UE of claim 7, wherein to generate the second scrambling sequence on the per-symbol basis, the second scrambling circuitry is to: initialize the second scrambling sequence based on a symbol index within a slot for the UL NOMA data transmission.

9. The UE of claim 1, wherein the first scrambling sequence used in the first-part scrambling is a same scrambling sequence as the second scrambling sequence used in the second-part scrambling.

10. An apparatus comprising:

a plurality of circuit components to perform initial processing operations on data to be transmitted in an uplink (UL) non-orthogonal multiple access (NOMA) data transmission from a user equipment (UE) to a base station, the plurality of circuit components to include a spreader to spread modulated symbols; and a scrambler, coupled with the spreader to receive the spread modulated symbols, the scrambler to generate a scrambled sequence from the spread modulated symbols based on a scrambling sequence, wherein the scrambling sequence includes a pseudo noise (PN) modulated sequence that is generated based on a PN sequence, wherein the PN sequence is initialized based on a UE identifier, and a constant $\Delta$ that is predefined or configured based on a minimum system information (MSI) or configured based on a remaining minimum system information (RMSI).

11. The apparatus of claim 10, wherein the scrambler is to:

initialize the pseudo noise PN sequence based on the UE identifier, the constant $\Delta$, and at least one of a demodulation reference signal antenna port index, a physical cell identifier, a virtual cell identifier, a resource identifier, a symbol index, a slot index, or a frame index;

modulate the PN sequence with a quadrature phase shift keying modulation to provide the PN modulated sequence; and use the PN modulated sequence to generate the scrambled sequence.

12. The apparatus of claim 11, wherein the PN sequence is initialized based on a demodulation reference signal (DM-RS) sequence index, a DM-RS antenna port (AP) index associated with the UL NOMA data transmission, or a preamble index for a physical random access channel (PRACH) transmission associated with the UL NOMA data transmission.

13. The apparatus of claim 11, wherein the constant $\Delta$ used to initialize the PN sequence predefined.

14. The apparatus of claim 11, wherein the constant $\Delta$ used to initialize the PN sequence is configured by higher layers.

15. The apparatus of claim 14, wherein the constant $\Delta$ is configured by radio resource control (RRC) signaling.

16. The apparatus of claim 10, wherein the scrambler is to:

generate the scrambling sequence on a per-symbol basis; and use the scrambling sequence to generate the scrambled sequence.

17. The apparatus of claim 16, wherein, to generate the scrambling sequence on a per-symbol basis, the scrambler is to initialize the scrambling sequence based on a symbol index within a slot for the UL NOMA data transmission.

18. The apparatus of claim 10, wherein the scrambler is a first scrambler to generate a first scrambled sequence based on a first scrambling sequence, and the plurality of circuit components further includes a second scrambler to generate a second scrambled sequence based on a second scrambling sequence that is a same scrambling sequence as the first scrambling sequence.

19. A method, comprising:

receiving data to be transmitted in an uplink (UL) non-orthogonal multiple access (NOMA) data transmission from a user equipment (UE) to a base station;

encoding the data with a channel code to generate an encoded sequence;

performing first-part scrambling on the encoded sequence based on a first scrambling sequence to generate a first scrambled sequence, wherein the first scrambling sequence is initialized based on a physical cell identifier for a cell the UE is in;

generating modulated symbols based on the first scrambled sequence;

spreading the modulated symbols; and performing second-part scrambling on the spread modulated symbols based on a second scrambling sequence to generate a second scrambled sequence, wherein the second scrambling sequence includes a pseudo noise (PN) modulated sequence that is generated based on a PN sequence, wherein the PN sequence is initialized based on a UE identifier, and a constant $\Delta$ that is predefined or configured based on a minimum system information (MSI) or configured based on a remaining minimum system information (RMSI).

20. The method of claim 19, wherein the performing the second-part scrambling includes:
initialize the PN sequence based on the UE identifier, the constant $\Delta$, and at least one of a demodulation reference signal antenna port index, a physical cell identifier, a virtual cell identifier, a resource identifier, a symbol index, a slot index, or a frame index;
modulating the PN sequence with a quadrature phase shift keying modulation to provide the PN modulated sequence; and
using the PN modulated sequence to generate the second scrambled sequence.

* * * * *

UNITED STATES PATENT AND TRADEMARK OFFICE
CERTIFICATE OF CORRECTION

PATENT NO. : 11,171,744 B2  
APPLICATION NO. : 16/264243  
DATED : November 9, 2021  
INVENTOR(S) : Gang Xiong et al.

Page 1 of 1

It is certified that error appears in the above-identified patent and that said Letters Patent is hereby corrected as shown below:

In the Claims

Claim 2, Column 29, Line 23, "based on the user UE identifier," should read --based on the UE identifier--.

Claim 11, Column 30, Line 10, "initialize the pseudo noise PN sequence based on the UE" should read --initialize the PN sequence based on the UE--.

Signed and Sealed this  
Twenty-ninth Day of August, 2023

Katherine Kelly Vidal  
*Director of the United States Patent and Trademark Office*